(12) United States Patent
Aylsworth

(10) Patent No.: US 11,254,025 B2
(45) Date of Patent: Feb. 22, 2022

(54) LUMBER RETRIEVAL SYSTEM FOR A CENTRALLY LOCATED SAW

(71) Applicant: Steven L. Aylsworth, Chatfield, MN (US)

(72) Inventor: Steven L. Aylsworth, Chatfield, MN (US)

( * ) Notice: Subject to any disclaimer, the term of this patent is extended or adjusted under 35 U.S.C. 154(b) by 99 days.

(21) Appl. No.: 16/934,314

(22) Filed: Jul. 21, 2020

(65) Prior Publication Data
US 2020/0361115 A1 Nov. 19, 2020

Related U.S. Application Data

(60) Division of application No. 15/699,918, filed on Sep. 8, 2017, now Pat. No. 10,836,067, which is a
(Continued)

(51) Int. Cl.
*B27B 31/00* (2006.01)
*B23Q 7/04* (2006.01)
(Continued)

(52) U.S. Cl.
CPC .......... *B27B 31/00* (2013.01); *B23Q 7/04* (2013.01); *B25J 9/026* (2013.01); *B25J 15/0052* (2013.01);
(Continued)

(58) Field of Classification Search
CPC .. B23D 59/008; B23Q 7/04; B23Q 2240/007; B25J 9/023; B25J 19/02; B25J 19/021;
(Continued)

(56) References Cited

U.S. PATENT DOCUMENTS

| | | |
|---|---|---|
| 561,715 A | 6/1896 | Lynch |
| 2,730,144 A | 1/1956 | Joa |

(Continued)

FOREIGN PATENT DOCUMENTS

| | | |
|---|---|---|
| DE | 2501012 A1 | 7/1976 |
| DE | 4317767 A1 | 12/1994 |

(Continued)

OTHER PUBLICATIONS

Miser; Automated Wood Processing System; Koskovich brochure; 5 pgs.; Rochester, MN; copyright 2007.
(Continued)

*Primary Examiner* — Saul Rodriguez
*Assistant Examiner* — Brendan P Tighe
(74) *Attorney, Agent, or Firm* — Bobharter.com; Robert J. Harter

(57) ABSTRACT

Lumber retrieval systems and methods feed a centrally located saw with a predetermined assortment of boards picked from certain stations distributed at either side of the saw. In some examples, an overhead trolley system carries individual boards in a certain sequence from chosen stations to a board-receiving apparatus. The board-receiving apparatus, in turn, feeds the boards to the saw. The saw then cuts the boards into board segments, which can be used for making prefabricated trusses and wall panels. In some examples, the trolley system has a laser-scanning feature for determining the location of the next-to-pick board while simultaneously transporting the board currently heading to the board-receiving apparatus. In some examples, the trolley system includes two board carriers each of which are dedicated or assigned to certain stations. In some examples, one carrier serves as backup for the other one when one of the carriers is broken or otherwise inactive.

10 Claims, 19 Drawing Sheets

Related U.S. Application Data continuation-in-part of application No. 15/645,318, filed on Jul. 10, 2017, now Pat. No. 10,814,519, which is a continuation-in-part of application No. 15/486,228, filed on Apr. 12, 2017, now Pat. No. 10,525,587, which is a continuation-in-part of application No. 15/350,041, filed on Nov. 12, 2016, now Pat. No. 10,239,224, which is a continuation-in-part of application No. 15/331,824, filed on Oct. 22, 2016, now Pat. No. 10,421,209, which is a continuation-in-part of application No. 14/577,779, filed on Dec. 19, 2014, now Pat. No. 10,280,006, which is a division of application No. 13/136,922, filed on Aug. 15, 2011, now Pat. No. 8,960,244.

(60) Provisional application No. 62/393,061, filed on Sep. 11, 2016, provisional application No. 61/402,654, filed on Sep. 2, 2010.

(51) Int. Cl.
*B25J 15/00* (2006.01)
*B25J 9/02* (2006.01)
*B25J 15/06* (2006.01)
*B65G 47/91* (2006.01)
*B65G 47/90* (2006.01)

(52) U.S. Cl.
CPC ....... *B25J 15/0071* (2013.01); *B25J 15/0616* (2013.01); *B23Q 2240/007* (2013.01); *B65G 47/90* (2013.01); *B65G 47/91* (2013.01); *B65G 2201/0282* (2013.01)

(58) Field of Classification Search
CPC ....... B25J 19/022; B25J 19/023; B27B 31/00; B65G 1/0428; B65G 47/901; B65G 57/18; B65G 59/00; B65G 59/02; B65G 59/023; B65G 59/026; B65G 59/04; B65G 59/045; B65G 2201/0217; G01B 11/00; G01B 11/24; G01B 11/2433
USPC ........... 144/245.5, 245.7; 356/601, 602, 603, 356/604, 605, 606, 607, 608, 609, 610, 356/611, 612, 613; 414/222.01, 795.4, 414/796.5, 796.9, 797; 700/167
See application file for complete search history.

(56) References Cited

U.S. PATENT DOCUMENTS

| | | |
|---|---|---|
| 3,116,835 A | 1/1964 | Brandon |
| 3,254,764 A | 7/1966 | Boyle |
| 3,272,044 A | 9/1966 | Obenshain |
| 3,873,000 A | 3/1975 | Eaton et al. |
| 3,894,625 A | 7/1975 | Boyle et al. |
| 3,952,883 A | 4/1976 | Phillips |
| 4,185,672 A | 1/1980 | Vit et al. |
| 4,560,456 A | 12/1985 | Heil et al. |
| 4,610,360 A | 9/1986 | Forslund |
| 4,640,655 A | 2/1987 | Jacobsen |
| 4,838,748 A | 6/1989 | Johnson |
| 5,096,090 A | 3/1992 | Schwartz et al. |
| 5,249,915 A | 10/1993 | Ritola |
| 5,806,868 A | 9/1998 | Collins |
| 5,879,129 A | 3/1999 | Newnes et al. |
| 5,893,468 A | 4/1999 | Holmes |
| 5,899,659 A | 5/1999 | Beilsmith |
| 6,065,927 A | 5/2000 | Baron et al. |
| 6,379,105 B1 | 4/2002 | Aylsworth |
| 6,923,614 B2 | 8/2005 | Aylsworth |
| 7,736,120 B2 | 6/2010 | Pierson et al. |
| 7,746,481 B2 | 6/2010 | Kranz et al. |
| 7,950,316 B2 | 5/2011 | Koskovich |
| 8,348,287 B1 | 1/2013 | Smith |
| 10,207,421 B1* | 2/2019 | Weinschenk ............... B27B 5/36 |
| 2003/0006586 A1 | 1/2003 | Comilla |
| 2005/0120840 A1* | 6/2005 | Koskovich ........... B23D 59/008 83/13 |
| 2017/0305029 A1* | 10/2017 | Aylsworth ............... B25J 15/00 |
| 2018/0001508 A1* | 1/2018 | Aylsworth ............. B27B 31/00 |
| 2019/0275694 A1 | 9/2019 | Aylsworth |

FOREIGN PATENT DOCUMENTS

| | | |
|---|---|---|
| DE | 19617818 A1 | 11/1997 |
| FR | 2673923 A1 | 9/1992 |
| FR | 2675493 A1 | 10/1992 |

OTHER PUBLICATIONS

OMNI; Automated Lumber Processing System; CAD drawings; 2 pgs.; published 2008 or earlier.

Wood Truss Systems; 2006 Weinmann WBZ 100 Linear Saw; sales advertisement; 2 pgs., equipment itself in publich domain in 2006 or earlier.

Handling Portal WHP; Weinmann sales specs.; one page; published 2008 or earlier.

Stiles; Weinmann Robotic Saw System; sales literature and equipment specs; 6 pages; equipment itself in public domain in 2006 or earlier.

SBC; SBC Magazine; 33 pages; Madison, WI; Sep. 2008.

Stiles, Weinmann Robotic Saw System and Material Handling Portal, sales advertisement in SBC magazine; 1 page Madison, WI; published Sep. 2008.

* cited by examiner

LUMBER RETRIEVAL SYSTEM FOR A CENTRALLY LOCATED SAW

CROSS REFERENCE TO RELATED APPLICATIONS

This present application is a division of U.S. patent application Ser. No. 15/699,918 filed on Sep. 8, 2017; which is a continuation-in-part of U.S. patent application Ser. No. 15/645,318 filed on Jul. 10, 2017; which is a continuation-in-part of U.S. patent application Ser. No. 15/486,228 filed on Apr. 12, 2017 now U.S. Pat. No. 10,525,587; which is a continuation-in-part of U.S. patent application Ser. No. 15/350,041 filed on Nov. 12, 2016 now U.S. Pat. No. 10,239,224; which is a continuation-in-part of U.S. patent application Ser. No. 15/331,824 filed on Oct. 22, 2016 now U.S. Pat. No. 10,421,209; which is a continuation-in-part of U.S. patent application Ser. No. 14/577,779 filed on Dec. 19, 2014 now U.S. Pat. No. 10,280,006; which is a division of U.S. patent application Ser. No. 13/136,922 filed on Aug. 15, 2011 now U.S. Pat. No. 8,960,244; which claims priority to provisional patent application No. 61/402,654 filed on Sep. 2, 2010. This present application also claims priority to provisional patent application No. 62/393,061 filed on Sep. 11, 2016. Each of the aforementioned applications and patents are specifically incorporated herein by reference.

FIELD OF THE DISCLOSURE

The subject invention generally pertains to material handling equipment and more specifically to the delivery of lumber to a saw.

BACKGROUND

Various machines and methods have been developed for retrieving individual pieces of lumber or boards stacked at one location and feeding the boards individually to a saw. Examples of such systems are disclosed in U.S. Pat. Nos. 6,379,105 and 6,923,614; each of which are specifically incorporated herein by reference. Additional lumber handling systems are disclosed in U.S. Pat. Nos. 2,730,144; 3,873,000 and 3,952,883; each of which are specifically incorporated herein by reference. A lumber processing system for making prefabricated trusses and panels is disclosed in U.S. Pat. No. 7,950,316; which is specifically incorporated herein by reference.

DETAILED DESCRIPTION

Figure 1:
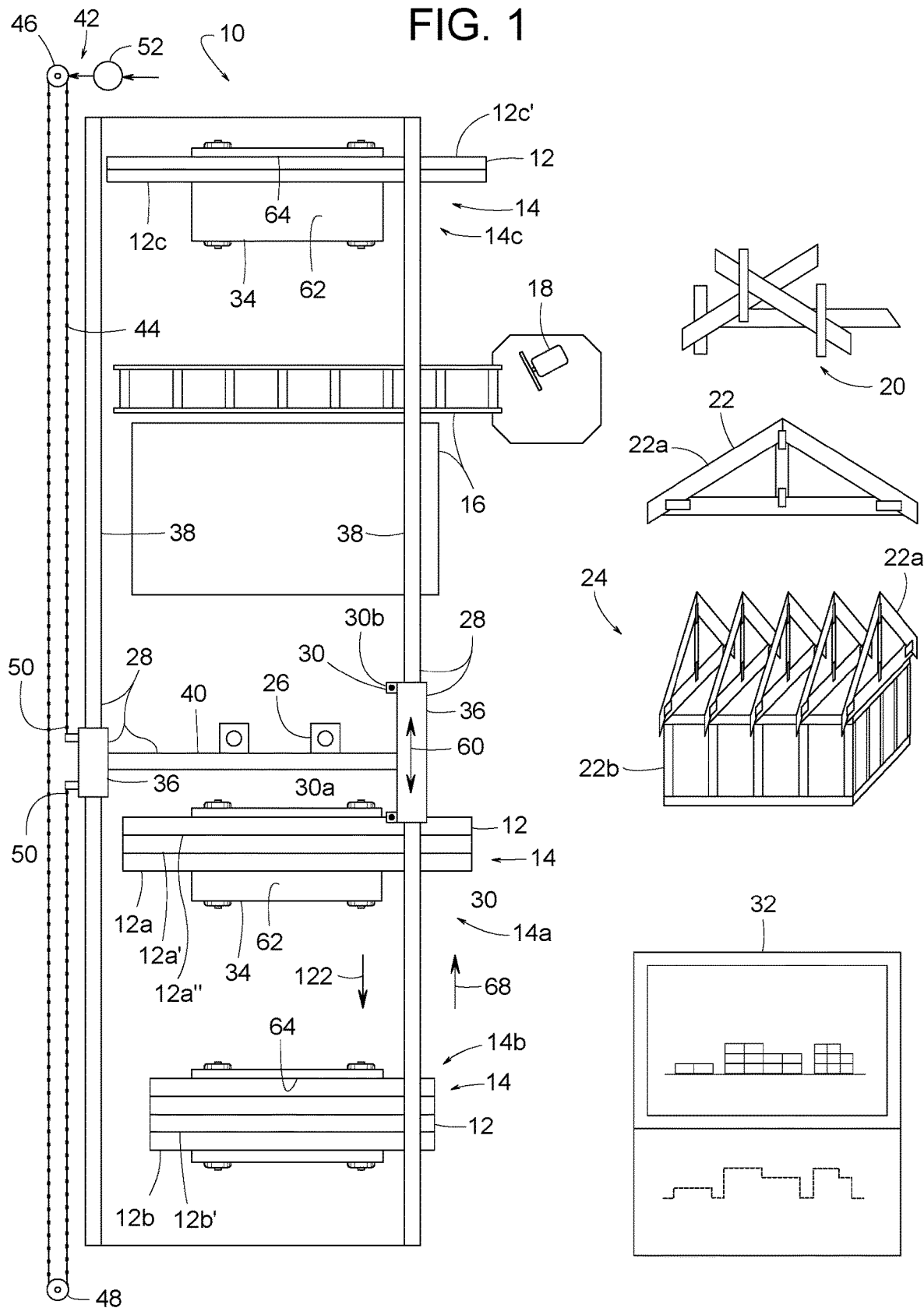
FIG. 1 is a schematic diagram showing a top view of an example lumber retrieval system and method in accordance with the teachings disclosed herein.

FIGS. 1-17 show an example lumber retrieval system 10 and methods of using it for retrieving a plurality of boards 12 of various sizes (i.e., various widths, various lengths, and/or various thicknesses) from a plurality of board-holding stations 14 (e.g., a first station 14a, a second station 14b, a third station 14c, etc.) and delivering boards 12 to a board-receiving apparatus 16, which in turn directs boards 12 to a powered saw 18. Saw 18 then cuts boards 12 into board segments 20 of prescribed lengths suitable for assembling into various board assemblies 22 (e.g., a roof truss 22a, a wall panel 22b, etc.). Board assemblies 22 are useful as prefabricated structures in the construction of a building 24 (e.g., a home, a warehouse, a commercial building, etc.). To minimize the distance boards 12 must travel and thus minimize the time of retrieving boards 12, stations 14 are distributed on either side of board-receiving apparatus 16. Either side of board-receiving apparatus 16 can have any number of stations 14.

In the illustrated example, lumber retrieval system 10 and its associated method involves the use of saw 18, plurality of stations 14, a board picker 26, plurality of boards 12 (e.g., a first board 12a, a second board 12b, a third board 12c, etc.), a trolley system 28, at least one touch-free sensor 30 (e.g., a first touch-free sensor 30a, a second touch-free sensor 30b, etc.), board-receiving apparatus 16, and an electronic controller 32. Saw 18 is schematically illustrated to represent any powered machine tool known for cutting lumber. In some examples, saw 18 is controlled by electronic controller 32. Board-receiving apparatus 16 is schematically illustrated to represent any single structure or multiple structures for receiving boards 12 from trolley system 28 (or alternative material handling apparatus) and transferring those boards to where the boards can be eventually received and cut by saw 18. Examples of board-receiving apparatus 16 include, but are not limited to, one or more powered conveyors, one or more non-powered conveyors, one or more ramps, one or more chutes, one or more platforms, one or more tables, one or more part transfer mechanisms, and various combinations thereof.

The term, "station" refers to any designated area for supporting one or more stacks of lumber (boards 12). A station could include a single stack of lumber of the same size boards 12, a single stack of lumber of different size boards, multiple spaced-apart stacks of lumber comprising boards of equal size or of different sizes, and a plurality of boards of an assortment of sizes mixed together or divided and organized in a magazine. Examples of station 14 include, but are not limited to, a cart, a pallet, a magazine, a shelf, floor, etc. The term, "plurality of stations" means that there are multiple stations each having a stack of lumber, wherein the stacks of lumber are spaced apart from each other. In the some examples, one or more of stations 14 comprise a cart 34, which makes it easier for replenishing station 14 with boards 12.

Trolley system 28 is schematically illustrated to represent any piece of equipment comprising at least one carrier 36 (e.g., a wheeled track follower) that travels along one or more tracks 38 (e.g., a rail, a beam, etc.). In some examples, trolley system 28 has two parallel tracks 38, and carrier 36 comprises a beam 40 extending laterally between the two tracks 38. Wheels at each end of beam 40 minimize drag between carrier 36 and tracks 38. In the examples shown in FIGS. 18-20, a trolley system 28' includes two independently movable carriers 36 (a first carrier 36a and a second carrier 36b), which will be explained later.

In some examples, a trolley drive unit 42 moves carrier 36 along the length of tracks 38. Tracks 38 guide carrier 36 over the stations 14 and over board-receiving apparatus 16. In some examples, drive unit 42 comprises a cogged belt 44 supported between a drive cogged wheel 46 and an idler cogged wheel 48 with opposite ends 50 of belt 44 being attached directly or indirectly to carrier 36. Drive wheel 46 is driven by a motor 52 under the command of controller 32. In some examples, motor 52 is a model AM3042-1G00-000 servomotor by Beckhoff of Verl, Germany. Other examples of trolley drive unit 42 include, but are not limited to, pneumatic cylinders, hydraulic cylinders, rodless cylinders, linear motors, drive screws, rack-and-pinion mechanisms, etc.

In some examples, trolley system 28 includes two independently movable carriers 36, wherein one carrier 36 carries one or more sensors 30, and the other carrier 36 carries board picker 26. In the illustrated example, trolley system 28 has one carrier 36 that carries both sensor 30 and board picker 26 (i.e., at least one sensor 30 and at least one board picker 26).

Board picker 26 is schematically illustrated to represent any apparatus capable of lifting a board 12 up from a stack of lumber at a station 14. Examples of board picker 26 include, but are not limited to, one or more piercing tools 54 (FIGS. 21-25), one or more suction cups 56 (FIGS. 26-29), one or more hooks, one or more grippers, etc. A further description of board picker 26 is found herein with reference to FIGS. 21-29, and further details of various example board pickers 26 and other details of lumber retrieval system 10 are disclosed in U.S. Pat. No. 8,960,244 and patent application Ser. Nos. 15/331,824 and 15/486,228 all of which are specifically incorporated herein by reference.

Sensor 30 is schematically illustrated to represent any touch-free sensor for detecting the presence and location of boards 12. The term, "touch-free" means that sensor 30 is in scanning relationship with the lumber, so senor 30 scans the lumber without having to physically touch it. In some examples, sensor 30 is a laser unit that emits a laser beam 58 for sensing a vertical distance between a surface and the laser emitting device. An example of a laser version of sensor 30 includes, but is not limited to, a model RF603-260/1250-232-I-IN-AL-CC-3 laser triangulation position sensor provided by Riftek of Minsk, Republic of Belarus. Sensor 30, board picker 26 and trolley system 28 exchange signals with electronic controller 32.

Electronic controller 32 is schematically illustrated to represent any electrical system that provides output signals in response to input signals. The input signals come from various lumber retrieval system devices (e.g., sensor 30, an encoder associated with trolley drive unit 42, various limit switches of board picker 26, various limit switches of board-receiving apparatus 16, saw 18, manual switches, etc.). The output signals from controller 32 determine the operation of various lumber retrieval system components (e.g., motor 52 of trolley drive unit 42, board picker 26, saw 18, etc.). Examples of controller 32 include, but are not limited to, a single computer; a system of multiple computers; a single PLC (programmable logic controller); a system of multiple PLCs; various combinations of one or more computers and PLCs; and various combinations of computers, PLCs, sensors, laser units, switches, touchscreens, relays, etc. A specific example of controller 32 is a model CP6201-0001-0200 industrial computer by Beckhoff of Verl, Germany.

Figure 2:
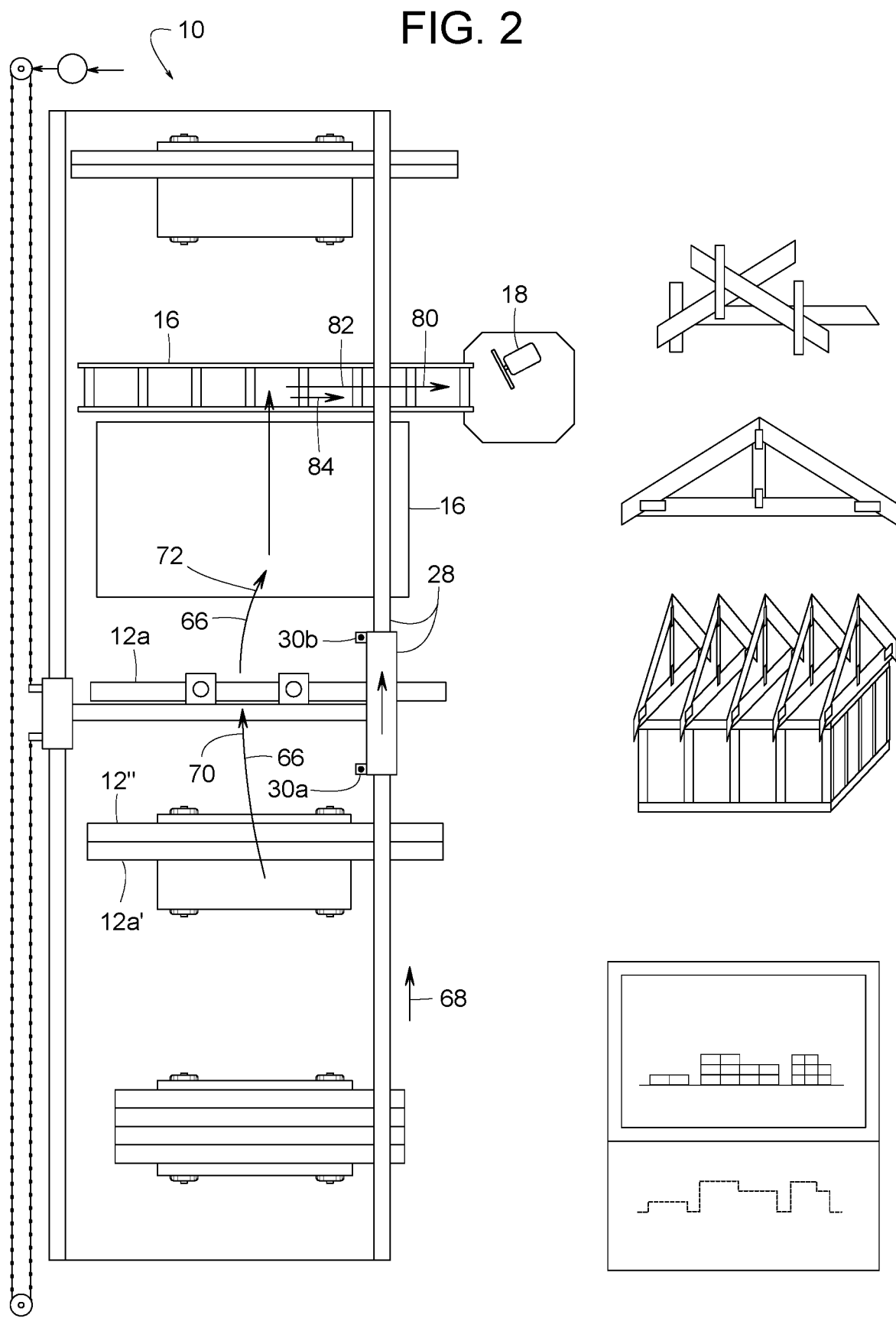
FIG. 2 is a top view similar to FIG. 1 but showing a first board being transported to a board receiving area and then to a saw.
Figure 3:
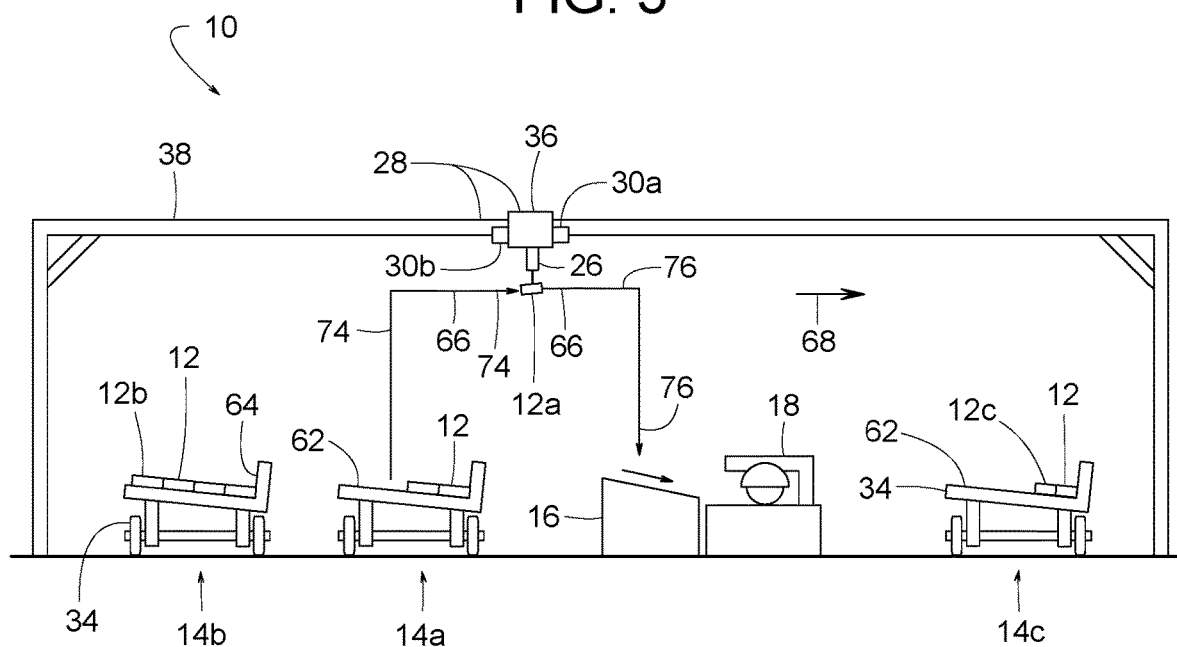
FIG. 3 is a side view of FIG. 2.
Figure 4:
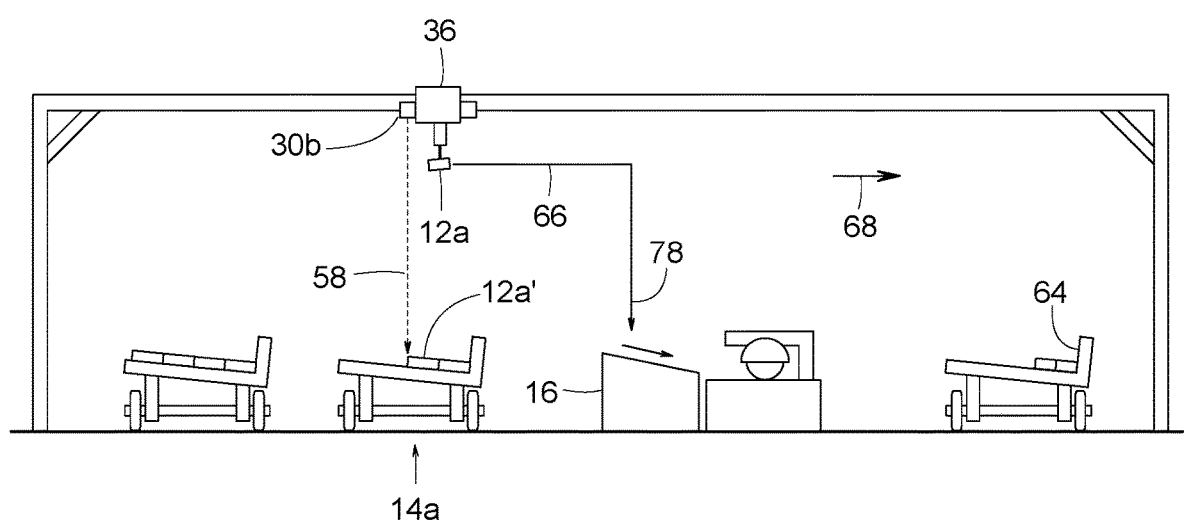
FIG. 4 is a side view similar to FIG. 3 but with a carrier of the lumber retrieval system's trolley system being at a different location.
Figure 5:
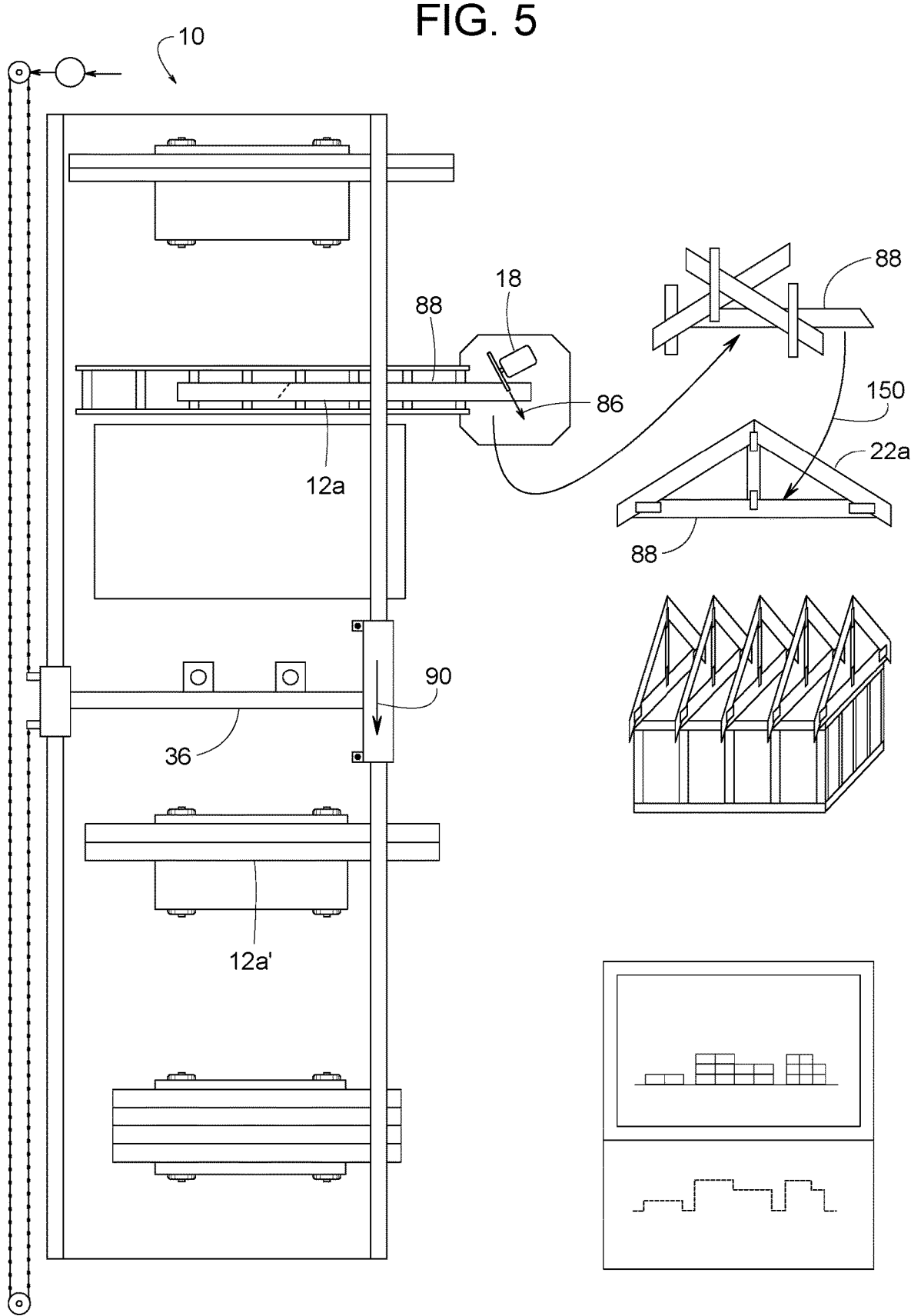
FIG. 5 is a top view similar to FIG. 2 but showing the saw cutting the first board while the trolley system fetches another board.
Figure 6:
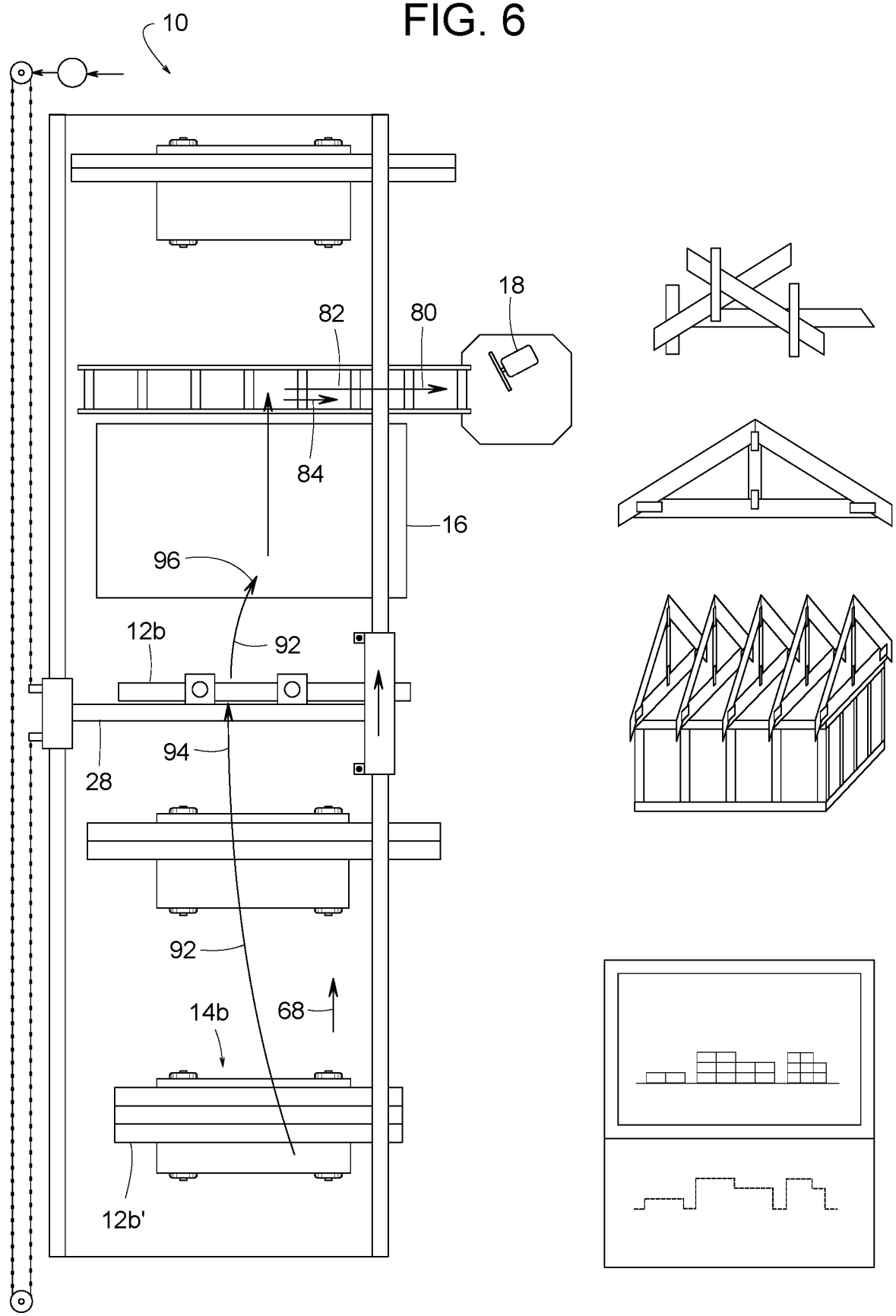
FIG. 6 is a top view similar to FIG. 5 but showing a second board being transported to the board receiving area and then to the saw.
Figure 7:
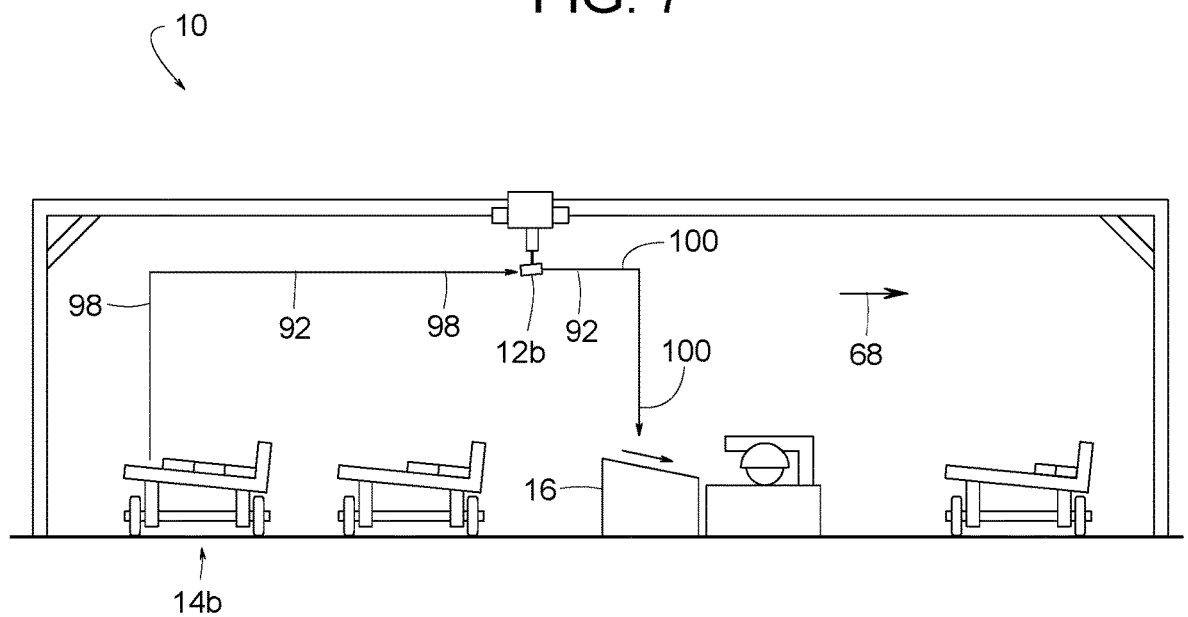
FIG. 7 is a side view of FIG. 6.
Figure 8:
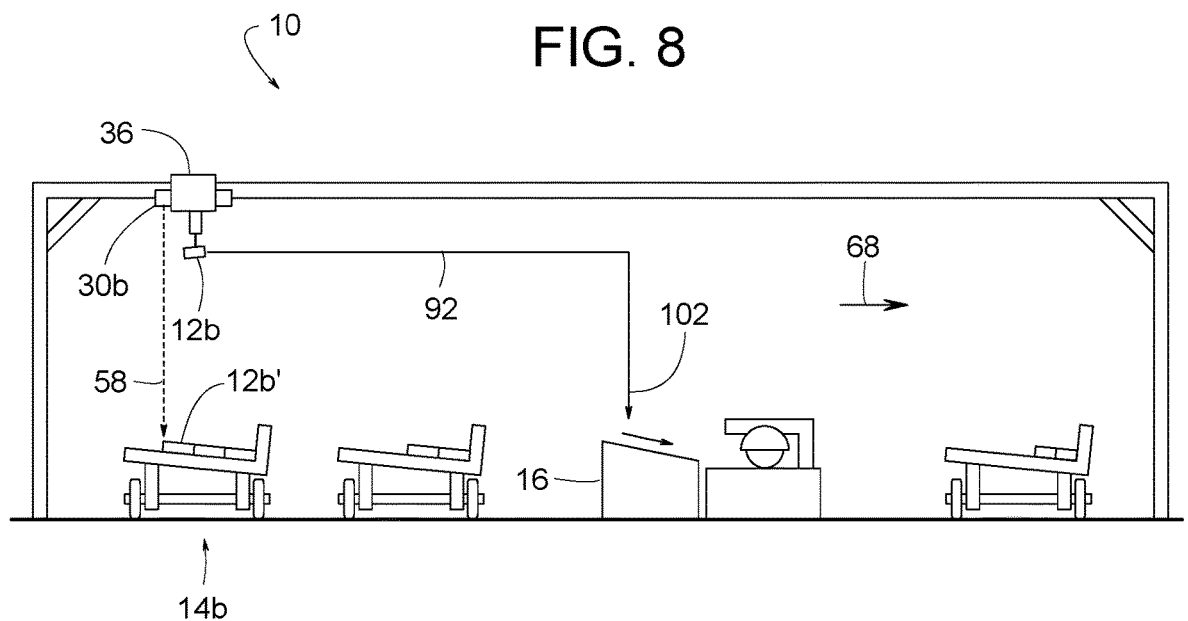
FIG. 8 is a side view similar to FIG. 7 but with the carrier being at a different location.

One example operating sequence of lumber retrieval system 10 is shown in FIGS. 1-9. FIGS. 3 and 4 provide a side view of FIG. 2, and FIGS. 7 and 8 provide a side view of FIG. 6. To begin, arrow 60 of FIG. 1 represents carrier 36 of trolley system 28 carrying two sensors 30 (front sensor 30a and rear sensor 30b) across stations 14 to scan and thus map the initial upper surface profile of each stack of boards 12 at stations 14. Controller 32 uses this information to identify the preferred first-to-pick board 12 of each station 14. In some examples, the first-to-pick board of a given station is the farthest left board 12 (left with respect to the views shown in FIGS. 3, 4, 7 and 8) of the highest layer of boards of a station with one or more layers of boards 12. In the illustrated examples, each station 14 is shown with just a single layer of boards 12 for sake of simplicity. The far left board 12 is preferred because each station 14 has a board-supporting surface 62 that, in some examples, leans downhill to the right (right with respect to the views shown in FIGS. 3, 4, 7 and 8), thus any stack of boards 12 will be urged up against a backstop 64 of each station 14.

In this example, controller 32 determines that an orderly assembly of truss 22a means that saw 18 will need sequentially a first board 12a from first station 14a followed by a second board 12b from second station 14b. Depending on the size and design of truss 22a, subsequent boards 12 may also be needed to complete the assembly of truss 22a. FIGS. 2, 3 and 4 show trolley system 28 carrying first board 12a along a first board path 66 extending in a forward direction 68 from first station 14a to board-receiving apparatus 16, wherein first board path 66 is identified by arrows 70 and 72 of FIG. 2, arrows 74 and 76 of FIG. 3, and arrow 78 of FIG. 4. Arrow 80 of FIG. 2 identifies a saw-feeding path 82 along which board-receiving apparatus 16 transfers first board 12a toward saw 18 in a predetermined direction 84. To provide a compact floor arrangement of stations 14, board-receiving apparatus 16 and saw 18; predetermined direction 84 of saw-feeding path 82 is substantially perpendicular to forward direction 68 of first board path 66.

In FIG. 5, arrow 86 represents saw 18 cutting first board 12a to create a first board segment 88, which can be used for making truss 22a. While saw 18 is cutting first board 12a, arrow 90 represents carrier 36 traveling to pick up the next board 12.

It should be noted, in this example, that soon after lifting first board 12a from first station 14a and just as carrier 36 begins transporting first board 12a in forward direction 68 toward board-receiving apparatus 16, as shown in FIG. 4, rear sensor 30b scans the location of a next-picked board 12a' from first station 14a. Rear sensor 30b scanning first station 14a while carrier 36 is transporting first board 12a to board-receiving apparatus 16 saves time. Laser beam 58 emitted from rear sensor 30b, as shown in FIG. 4, represents rear sensor 30b scanning boards 12 at first station 14a.

FIGS. 6, 7 and 8 show trolley system 28 carrying second board 12b along a second board path 92 extending in forward direction 68 from second station 14b to board-receiving apparatus 16, wherein second board path 92 is identified by arrows 94 and 96 of FIG. 6, arrows 98 and 100 of FIG. 7, and arrow 102 of FIG. 8. Arrow 104 of FIG. 6 represents board-receiving apparatus 16 transferring second board 12b along saw-feeding path 106 in predetermined direction 84 toward saw 18.

Figure 9:
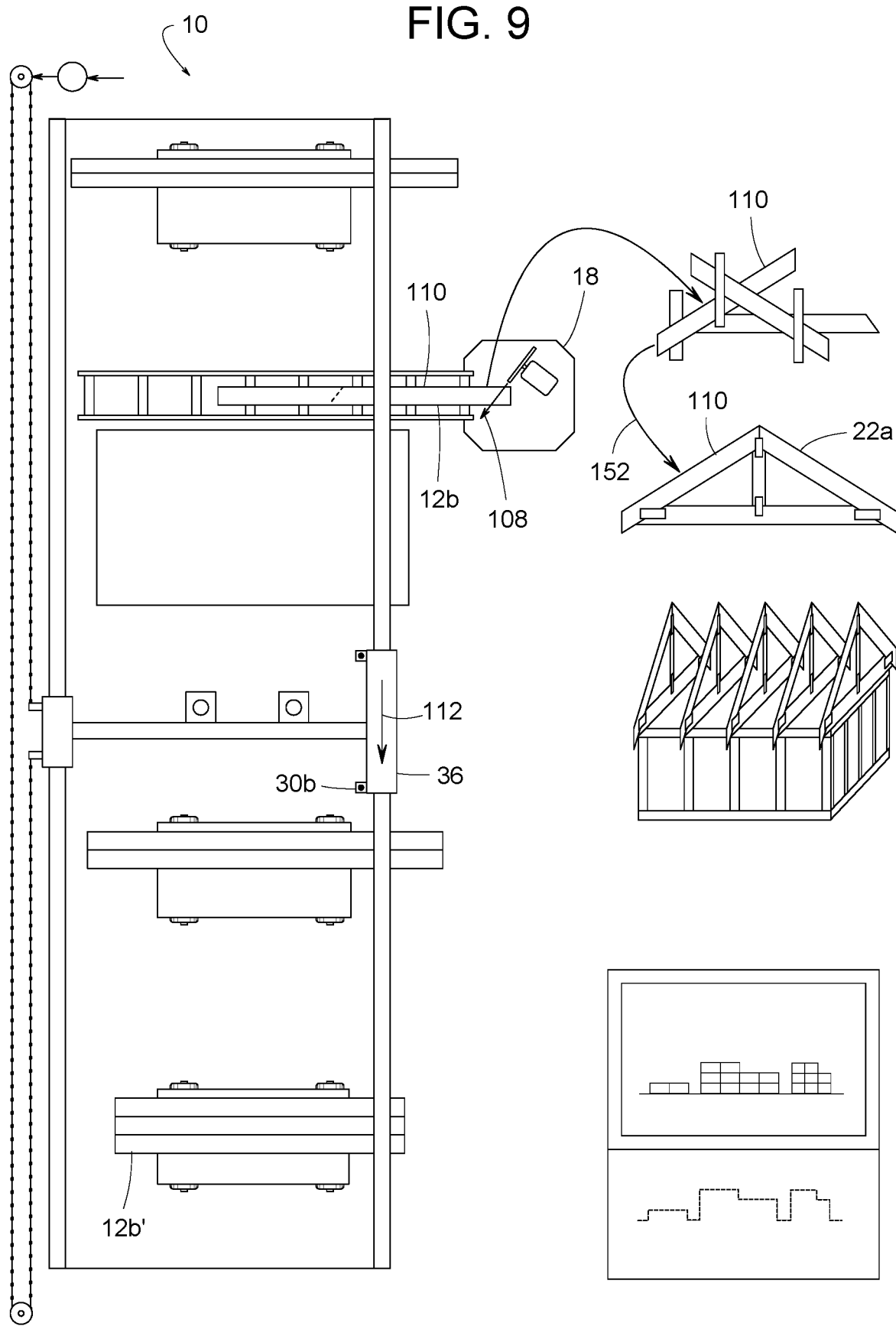
FIG. 9 is a top view similar to FIG. 5 but showing the saw cutting the second board while the trolley system fetches yet another board.

In FIG. 9, arrow 108 represents saw 18 cutting second board 12b to create a second board segment 110, which can be used for making truss 22a. While saw 18 is cutting second board 12b, arrow 112 represents carrier 36 traveling to pick up another board 12.

It should be noted, in this example, that soon after lifting second board 12b from second station 14b and just as carrier 36 begins transporting second board 12b in forward direction 68 toward board-receiving apparatus 16, as shown in FIG. 8, rear sensor 30b scans the location of a next-picked board 12b' from second station 14b. Rear sensor 30b scanning second station 14b while carrier 36 is transporting second board 12b to board-receiving apparatus 16 saves time. Laser beam 58 emitted from rear sensor 30b, as shown in FIG. 8, represents rear sensor 30b scanning boards 12 at second station 14b.

Figure 10:
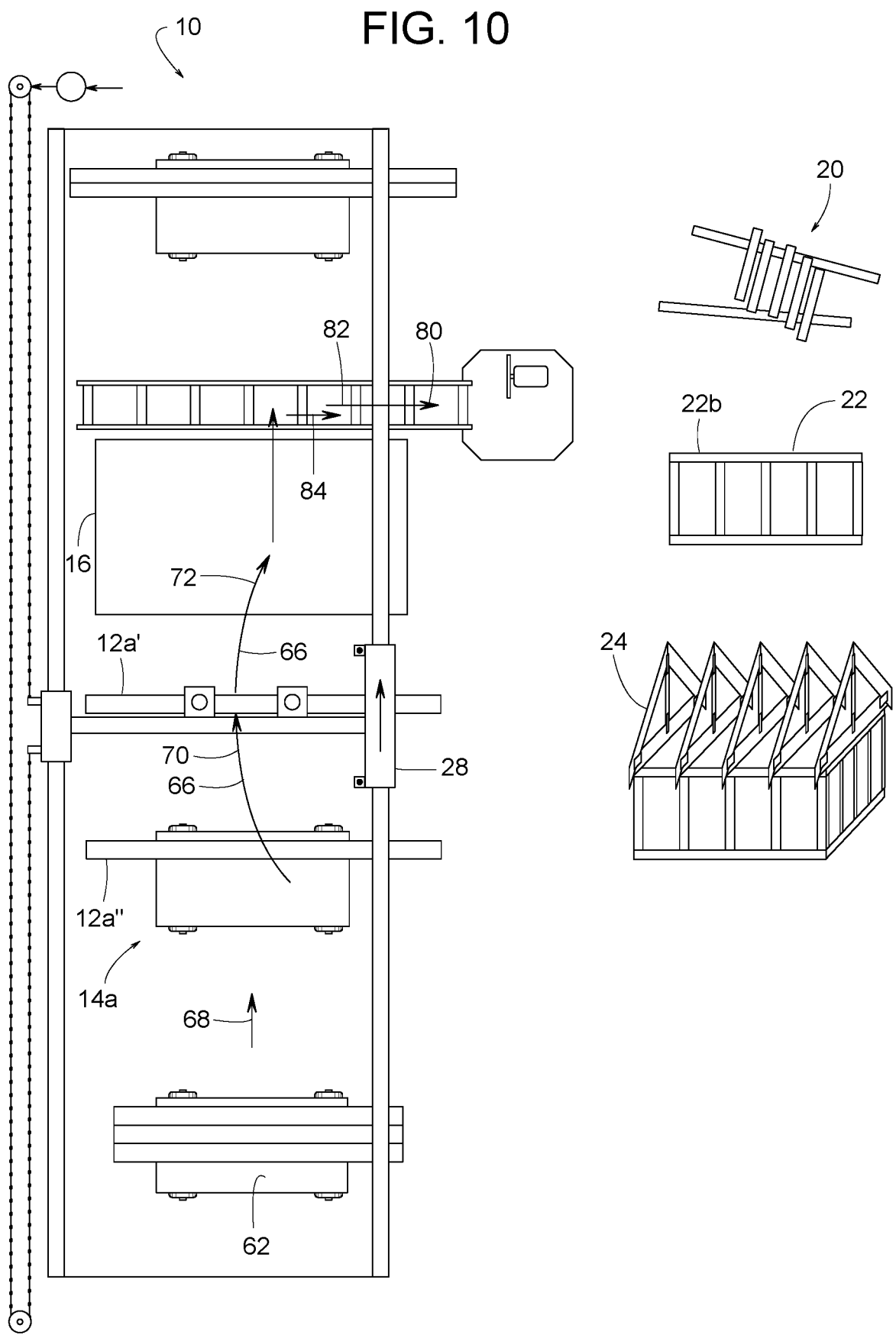
FIG. 10 is a top view similar to FIG. 2 but showing another board like the first one being transported to the board receiving area and then to the saw.
Figure 11:
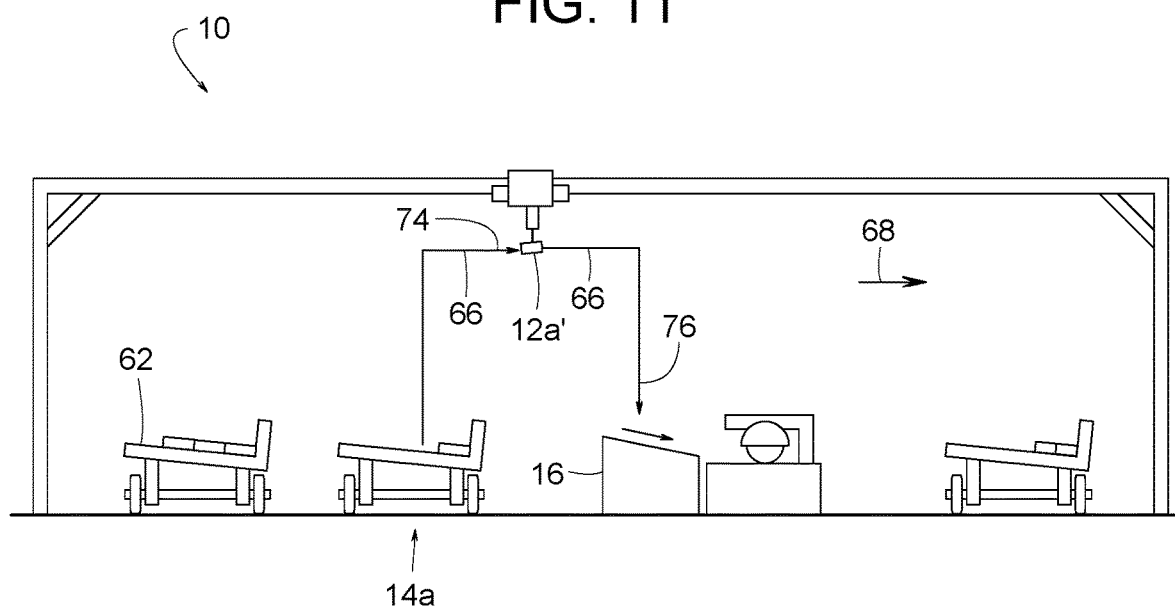
FIG. 11 is a side view of FIG. 10.
Figure 12:
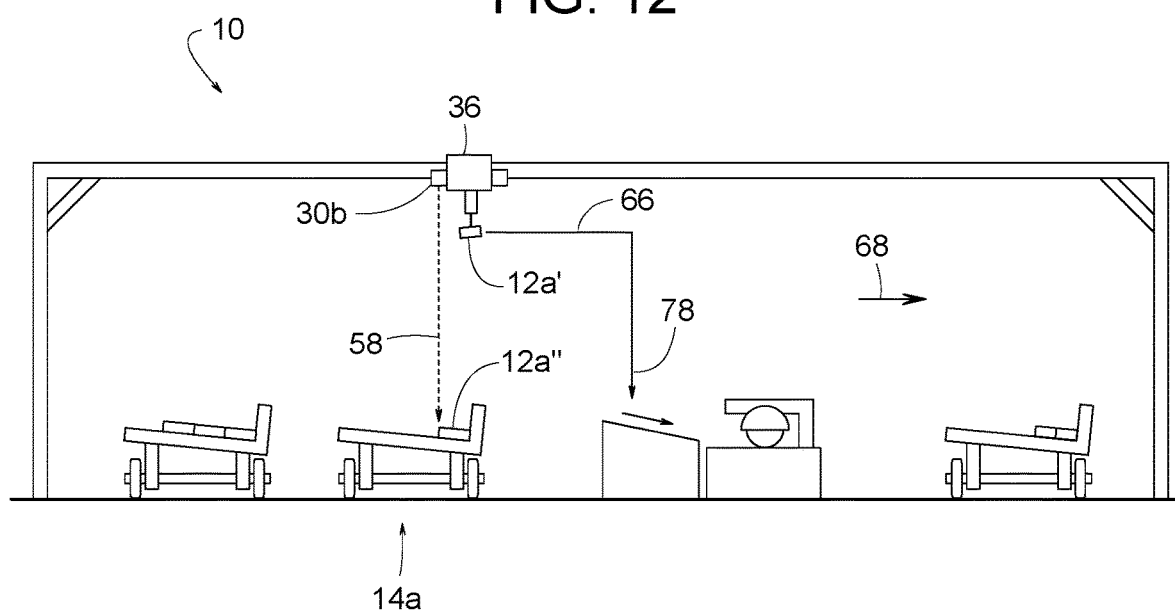
FIG. 12 is a side view similar to FIG. 11 but with the carrier being at a different location.

Lumber retrieval system 10 can be used for making selectively first board assembly 22a (roof truss), as shown in FIGS. 2-9, and second board assembly 22b (wall panel), as shown in FIGS. 10-17. For second board assembly 22b, FIGS. 10, 11 and 12 show trolley system 28 carrying another first board 12a' along first board path 66 extending in forward direction 68 from first station 14a to board-receiving apparatus 16, wherein first board path 66 is identified by arrows 70 and 72 of FIG. 10, arrows 74 and 76 of FIG. 11, and arrow 78 of FIG. 12. Arrow 80 of FIG. 10 represents board-receiving apparatus 16 transferring first board 12a' toward saw 18 in predetermined direction 84 along saw-feeding path 88.

Figure 13:
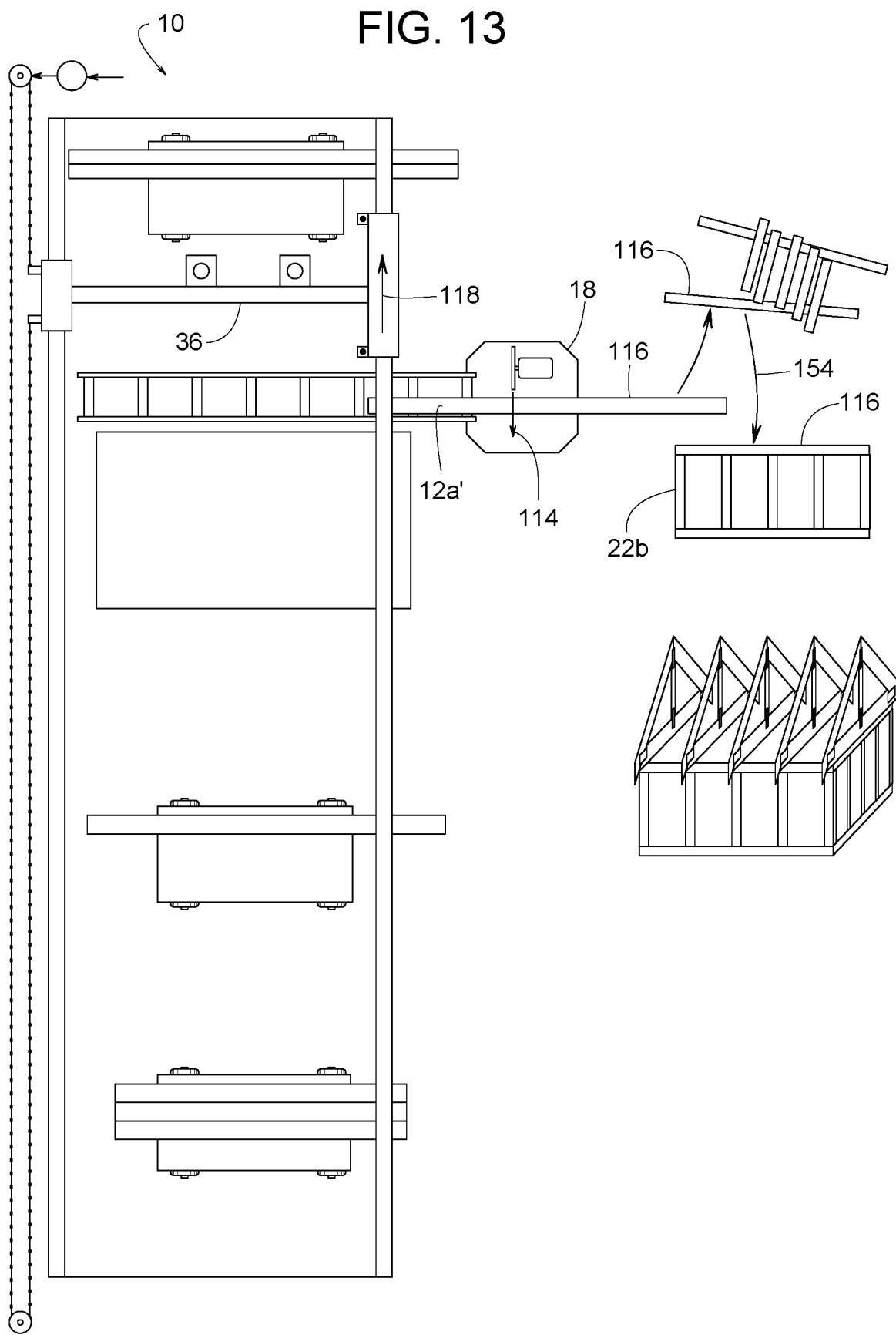
FIG. 13 is a top view similar to FIG. 10 but showing the saw cutting the board of FIG. 10 while the trolley system fetches yet another board.

In FIG. 13, arrow 114 represents saw 18 cutting first board 12a' to create an alternate first board segment 116, which can be used for making wall panel 22b. While saw 18 is cutting first board 12a', arrow 118 represents carrier 36 traveling to pick up the next board 12.

It should be noted, in this example, that soon after lifting first board 12a' from first station 14a and just as carrier 36 begins transporting first board 12a' in forward direction 68 toward board-receiving apparatus 16, as shown in FIG. 12, rear sensor 30b scans the location of a next-picked board 12" from first station 14a. Rear sensor 30b scanning first station 14a while carrier 36 is transporting first board 12a' to board-receiving apparatus 16 saves time. Laser beam 58 emitted from rear sensor 30b, as shown in FIG. 12, represents rear sensor 30b scanning boards 12 at first station 14a.

Figure 14:
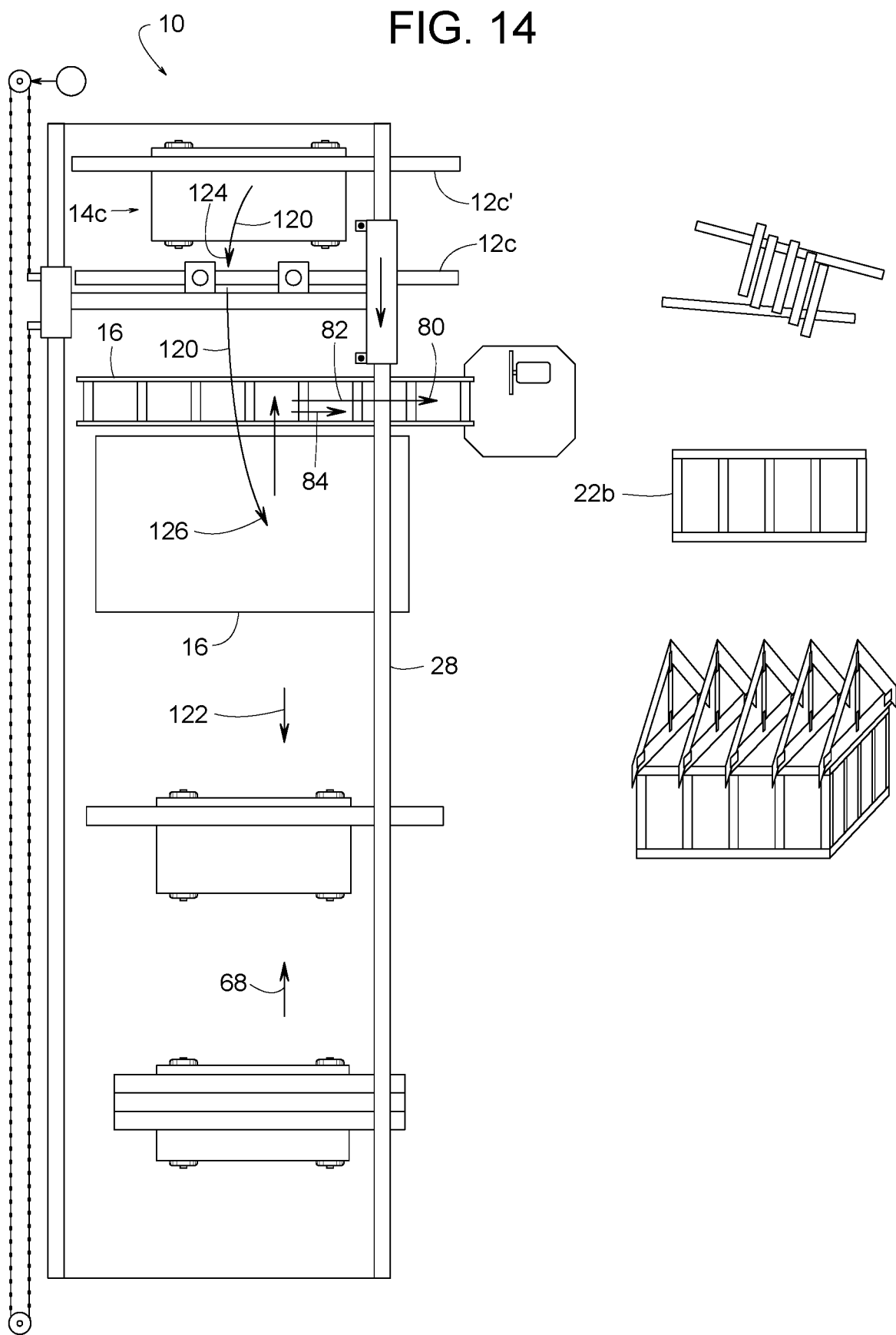
FIG. 14 is a top view similar to FIG. 5 but showing a third board being transported to the board receiving area and then to the saw.
Figure 15:
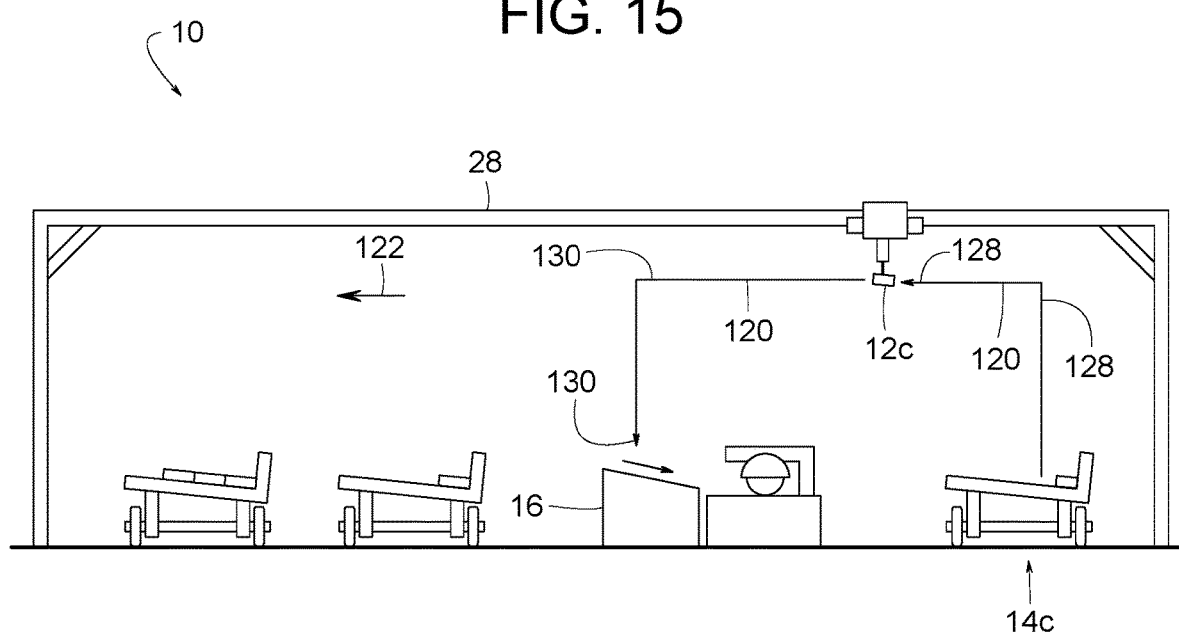
FIG. 15 is a side view of FIG. 14.
Figure 16:
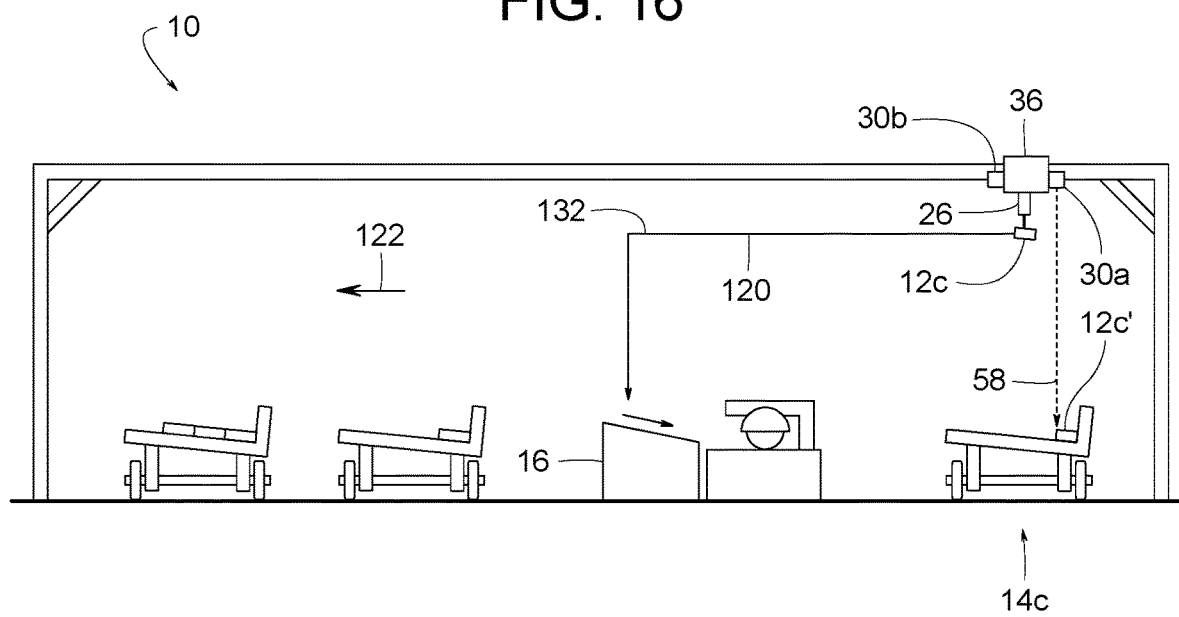
FIG. 16 is a side view similar to FIG. 15 but with the carrier being at a different location.

FIGS. 14, 15 and 16 show trolley system 28 carrying third board 12c along a third board path 120 extending in a reverse direction 122 (opposite forward direction 68) from third station 14c to board-receiving apparatus 16, wherein third board path 120 is identified by arrows 124 and 126 of FIG. 14, arrows 128 and 130 of FIG. 15, and arrow 132 of FIG. 16. Arrow 80 of FIG. 14 represents board-receiving apparatus 16 transferring third board 12c along saw-feeding path 82 in predetermined direction 84 toward saw 18.

Figure 17:
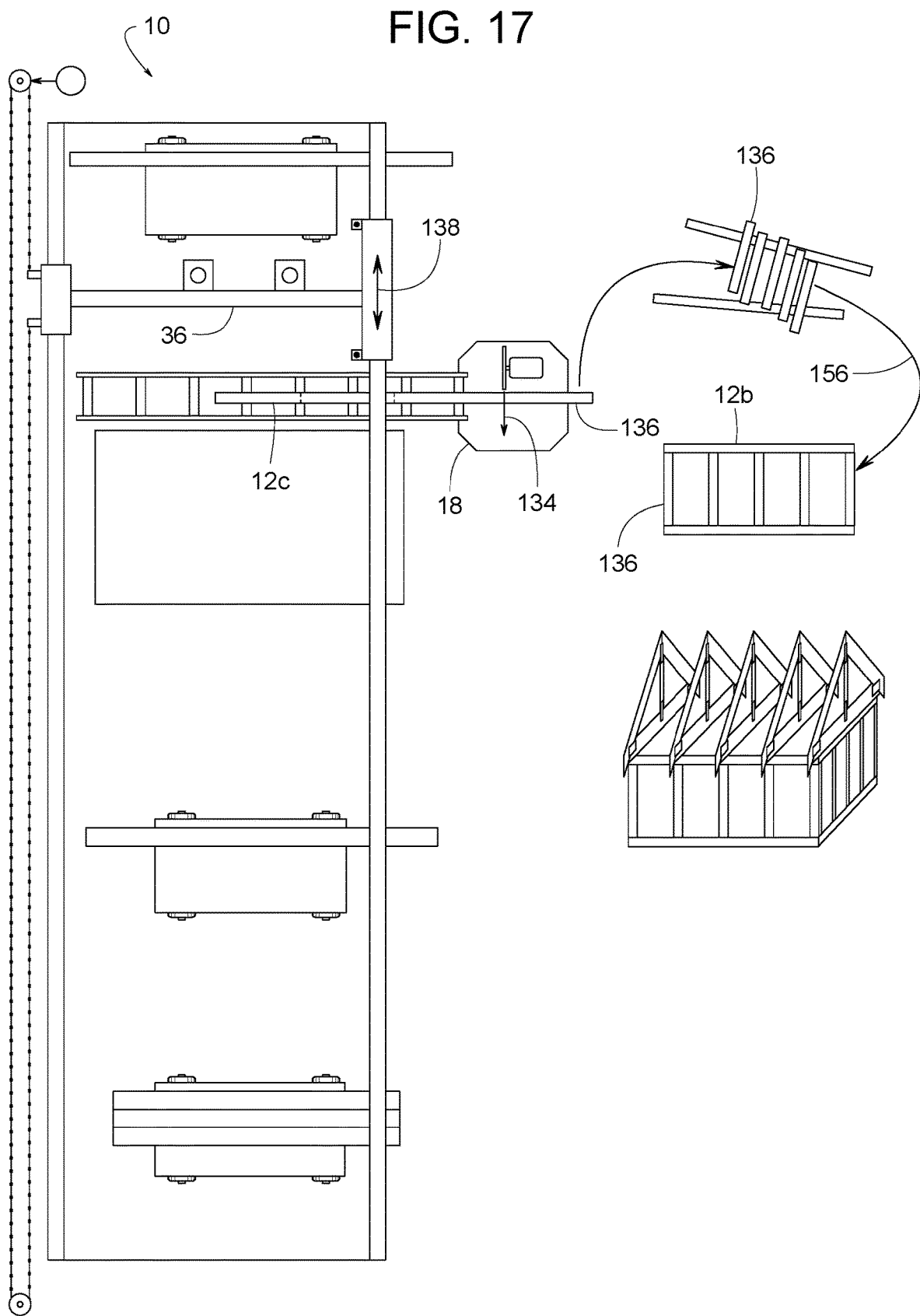
FIG. 17 is a top view similar to FIG. 14 but showing the saw cutting the third board while the trolley system fetches another board.

In FIG. 17, arrow 134 represents saw 18 cutting third board 12c to create a third board segment 136, which can be used for making wall panel 12b. While saw 18 is cutting third board 12c, arrow 138 represents carrier 36 traveling to pick up another board 12.

It should be noted, in this example, that soon after lifting third board 12c from third station 14c and just as carrier 36 begins transporting third board 12c in reverse direction 122 toward board-receiving apparatus 16, as shown in FIG. 16, front sensor 30a scans the location of a next-picked board 12c' from third station 14c, front sensor 30a scanning third station 14c while carrier 36 is transporting third board 12c to board-receiving apparatus 16 saves time. Laser beam 58 emitted from front sensor 30a, as shown in FIG. 16, represents front sensor 30a scanning boards 12 at third station 14c.

Having board picker 26 situated between two sensors 30 (front sensor 30a and rear sensor 30b) with respect to a horizontal direction running parallel to forward direction 68 and rear direction 122, provides a significant benefit. Such an arrangement allows trolley system 28 to remove one board 12 from a given station 14 while sensor 30a or 30b trailing board picker 26 simultaneously scans the next-to-pick board 12 at that same station 14. It gets challenging when stations 14 are on either side of board-receiving apparatus 16. Some examples of lumber retrieval system 10, however, overcome the challenge by having rear sensor 30b dedicated or assigned to scanning stations 14 on one side of board-receiving apparatus 16 (e.g., stations 14a and 14b)

and having front sensor 30a dedicated or assigned to scanning stations 14 on the other side of board-receiving apparatus 16 (e.g., station 14c).

Figure 18:
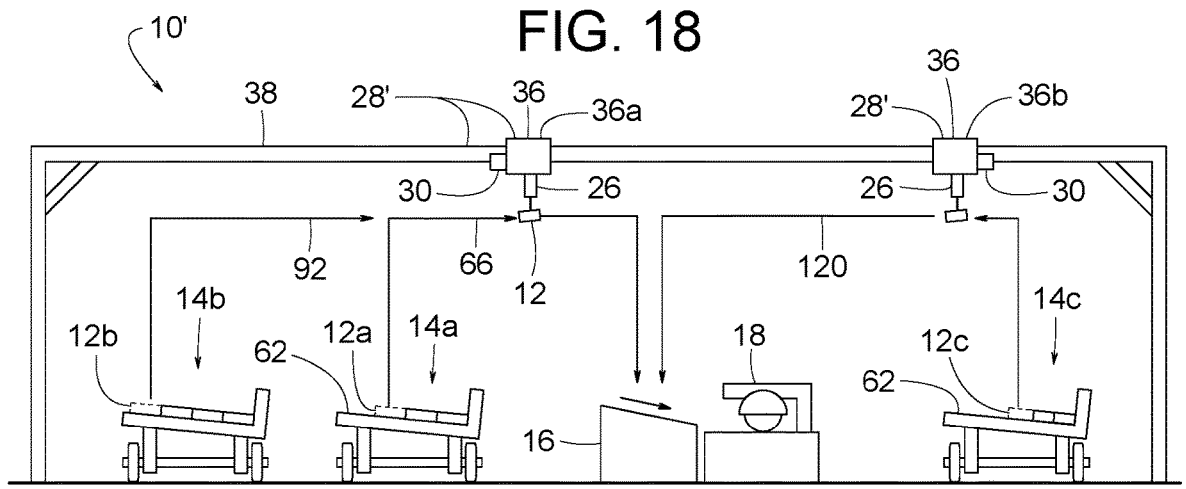
FIG. 18 is a side view similar to FIGS. 3, 4, 7, 8, 11, 12, 15 and 16 but showing another example lumber retrieval system and method in accordance with the teachings disclosed herein, wherein the system is in a first mode of operation.
Figure 19:
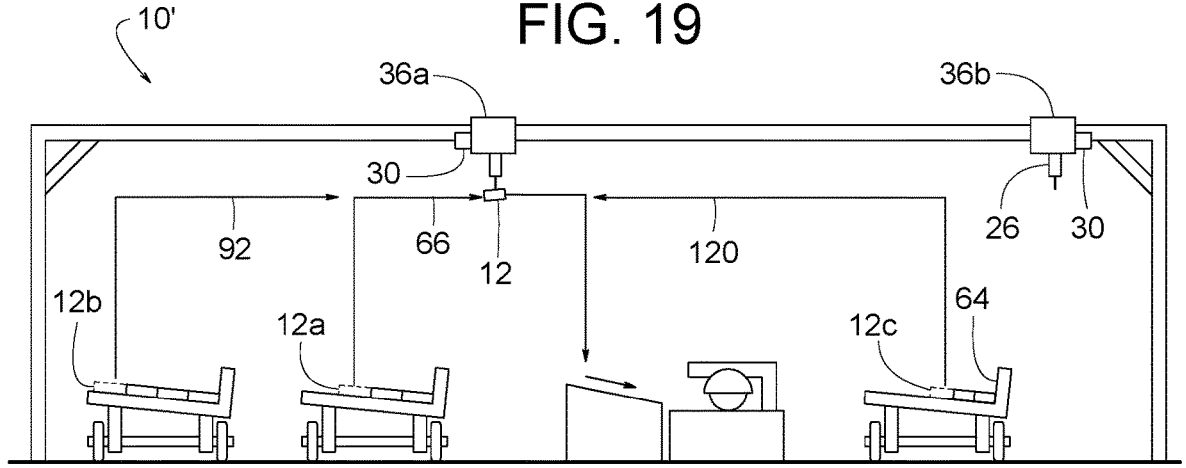
FIG. 19 is a side view similar to FIG. 18 but with the system in a second mode of operation.
Figure 20:
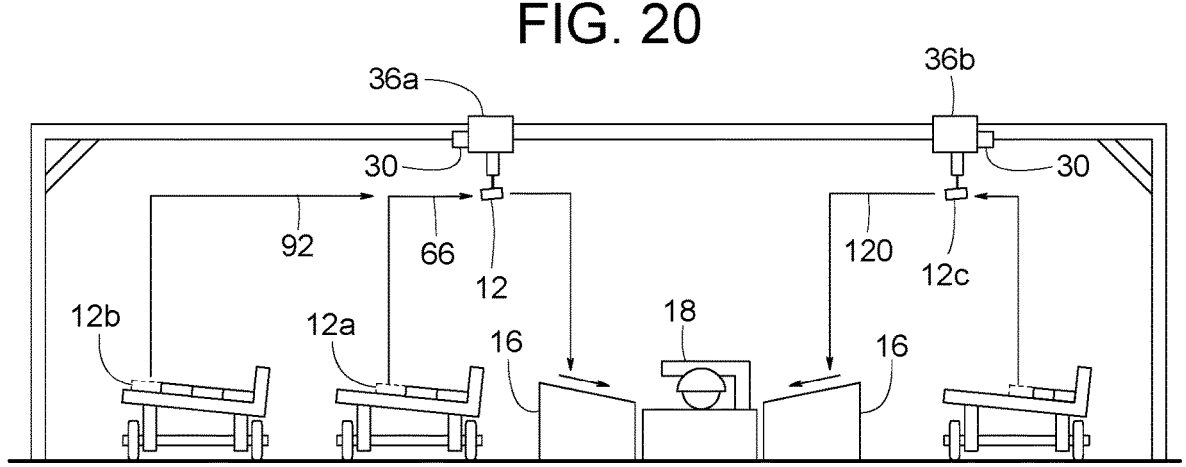
FIG. 20 is a side view similar to FIGS. 18 and 19 but showing yet another example lumber retrieval system and method in accordance with the teachings disclosed herein.

In the examples shown in FIGS. 18-20, trolley system 28' includes two carriers 36 (first carrier 36a and second carrier 36b) each with one or more board pickers 26. In some versions, each of the two carriers 36a and 36b is primarily designated to opposite sides of saw 18. Each side contains boards 12 which can be accessed by the designated carrier 36a or 36b. Depending on the design of the system, carriers 36a and 36b can deliver to a common point (e.g., FIG. 18) or to two different points (e.g., FIG. 20) spaced apart to prevent interference between the two carriers 36a and 36b. When boards 12 are delivered to a single point, as shown in FIG. 18, electronic controller 32 coordinates the carriers' movements to prevent collisions. When boards 12 are delivered to two different points, as shown in FIG. 20, carriers 36a and 36b naturally avoid each other. Employing two carriers 36a and 36b in the delivery system can greatly increase delivery speed as the total cycle time includes the retrieval process as well as the travel time. While first carrier 36a is retrieving one board 12, the other carrier 36b can be delivering a previously requested board 12. This coordinated action can dramatically reduce board delivery times.

In addition or alternatively, some examples disclosed herein would allow both carriers 36a and 36b to pass over board-receiving apparatus 16 and retrieve boards 12 from either side of saw 18. This motion is coordinated by electronic controller 32 to optimize the use of carriers 36a and 36b and to prevent carrier-to-carrier collisions. Another benefit of such a system is that if one carrier 36a or 36b is broken or otherwise inoperative, the other carrier 36a or 36b can still be used as backup for serving all stations 14 on either side of saw 18 and board-receiving apparatus 16. In examples where each carrier has only one sensor 30, as shown in FIGS. 18-20, the active carrier may need to do some slight backtracking when scanning boards 12 normally done by the inactive carrier. Alternatively, each carrier 36a and 36b can be provided with two sensors 30 to avoid the need for backtracking. Regardless, this feature does allow the system to continue delivering lumber to saw 18 and thus prevent a total shutdown of the system.

In systems that offer the option of using one active carrier to serve as a backup for an inactive carrier, electronic controller 32 provides lumber retrieval system 10' with selectively a first operating mode (FIG. 18) and a second operating mode (FIG. 19). In the first operating mode, as shown in FIG. 18, first carrier 36a carries first board 12a along first board path 66, first carrier 36a carries second board 12b along second board path 92, and second carrier 36b carries third board 12c along third board path 120. In the second operating mode, as shown in FIG. 19, first carrier 36a carries first board 12a along first board path 66 while second carrier 36b is substantially stationary, first carrier 36a carries second board 12b along second board path 92 while second carrier 36b is substantially stationary, and first carrier 36a carries third board 12c along third board path 120 while second carrier 36b is substantially stationary. As with previously described lumber retrieval systems, boards 12 are carried by way of board picker 26.

Although board picker 26 can be any device suitable for picking up board 12, FIGS. 21-25 show an example board picker 26a having a board-engaging screw 54a for selectively engaging, lifting and releasing board 12; and FIGS. 26-29 show an example board picker 26b having board-engaging suction cup 56 for selectively engaging, lifting and releasing board 12. Board picker 26a, as shown in FIGS. 21-25 comprises a frame 140 mounted to beam 40 of trolley system 28, a frame actuator 142 that extends and retracts frame 140 relative to beam 40, screw 54a for selectively engaging and releasing board 12, a motor 144 for turning screw 54a selectively clockwise and counterclockwise, and a screw actuator 146 that extends and retracts screw 54a and motor 144 relative to frame 140. In some examples, motor 144, frame actuator 142 and screw actuator 146 are controlled in response to output signals from electronic controller 32. Examples of actuators 142 and 146 include, but are not limited to, pneumatic cylinders, hydraulic cylinders, linear motors, etc.

Figure 21:
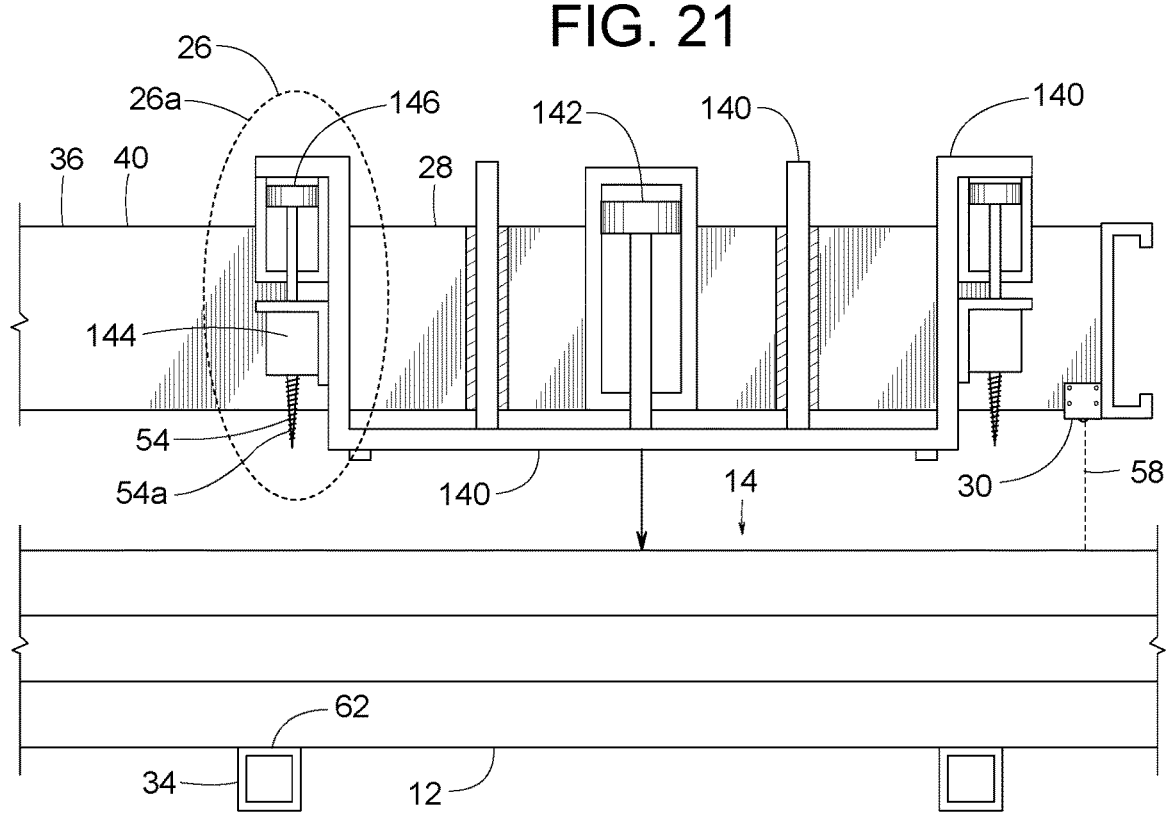
FIG. 21 is a cross-sectional side view of an example board picker constructed in accordance with the teachings disclosed herein, wherein the board picker is above and spaced apart from a board.
Figure 22:
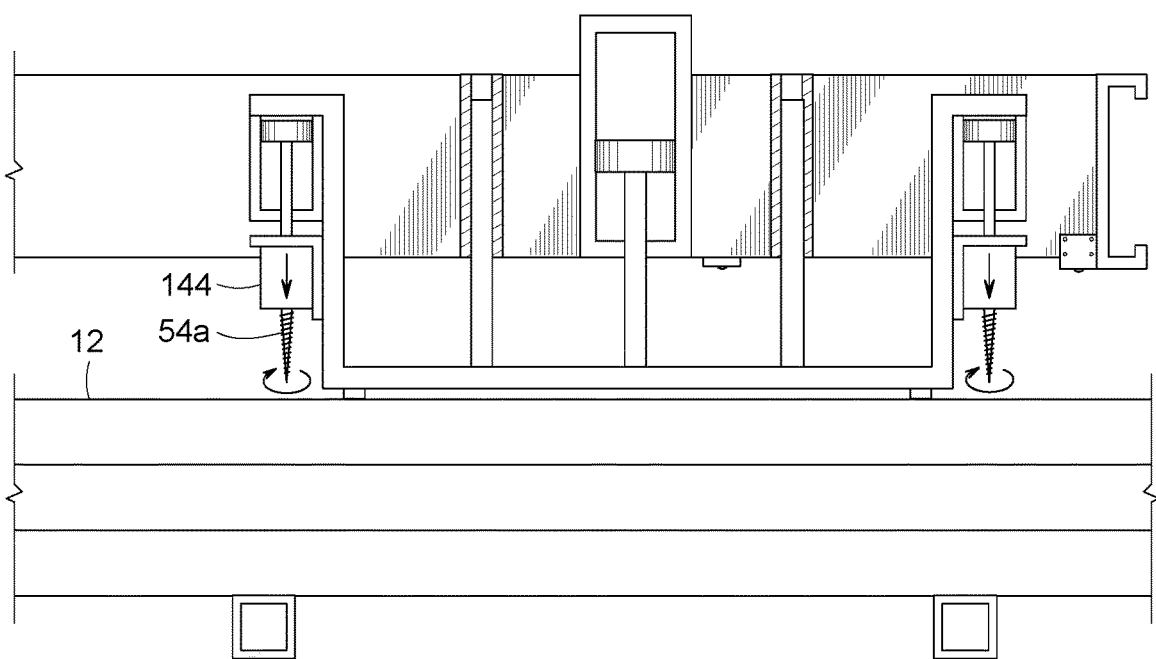
FIG. 22 is a cross-sectional side view similar to FIG. 22 but showing the board picker about to turn a screw into the board.
Figure 23:
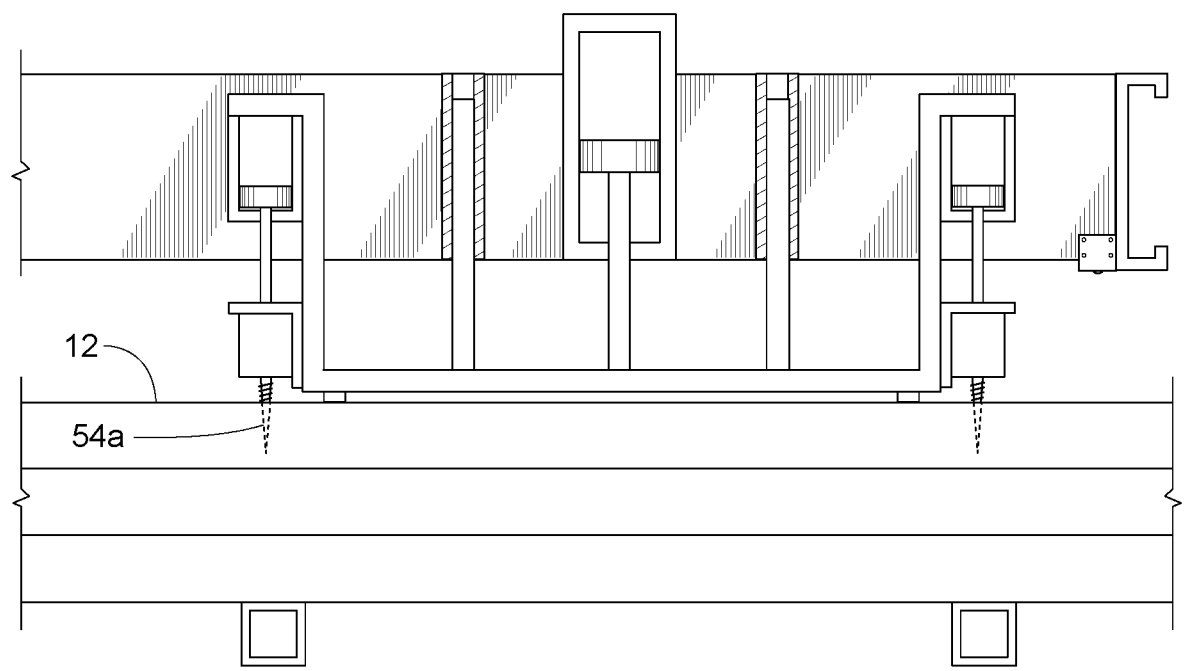
FIG. 23 is a cross-sectional side view similar to FIGS. 21 and 22 but showing the screw engaging the board.
Figure 24:
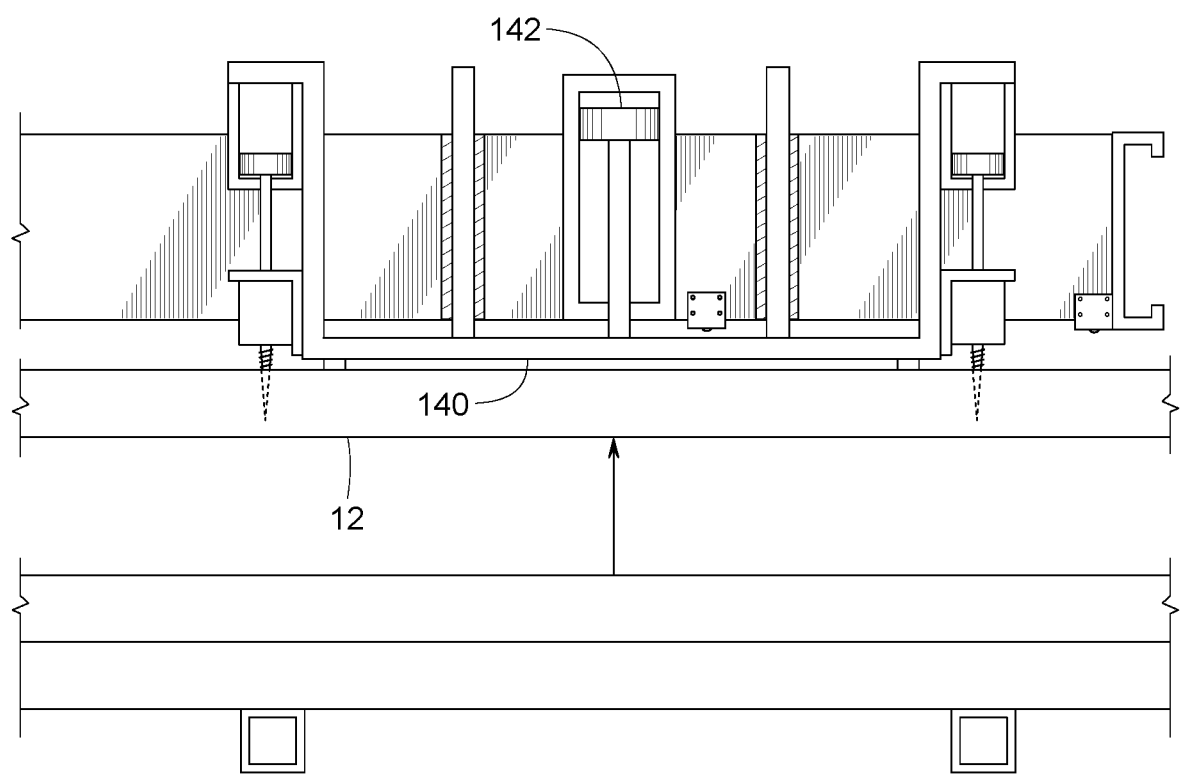
FIG. 24 is a cross-sectional side view similar to FIGS. 21, 22 and 23 but showing the board picker lifting the board.
Figure 25:
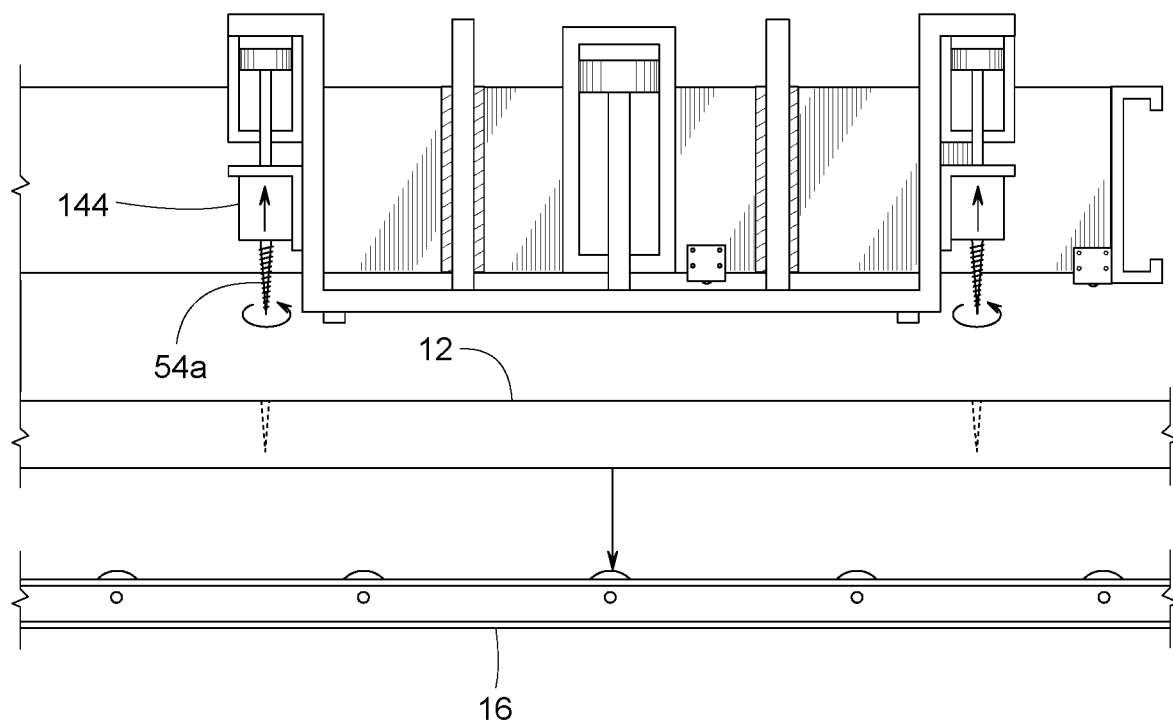
FIG. 25 is a cross-sectional side view similar to FIGS. 21, 22, 23 and 24 but showing the board picker releasing the board.

FIG. 21 shows frame actuator 142 lowering frame 140 and screw 54a toward board 12 at station 14. FIG. 22 shows motor 144 screwing screw 54a clockwise into board 12. FIG. 23 shows screw 54a screwed into board 12. FIG. 24 shows frame actuator 142 lifting frame 140 and board 12. FIG. 25 shows motor 144 unscrewing screw 54a from board 12, thereby allowing board 12 to fall down against board-receiving apparatus 16.

Board picker 26, as shown in FIGS. 26-29 comprises frame 140, frame actuator 142, suction cup 56 for selectively engaging and releasing board 12, and a vacuum pump 148 for selectively applying suction to suction cup 56. In some examples, vacuum pump 148 and frame actuator 142 are controlled in response to output signals from electronic controller 32.

Figure 26:
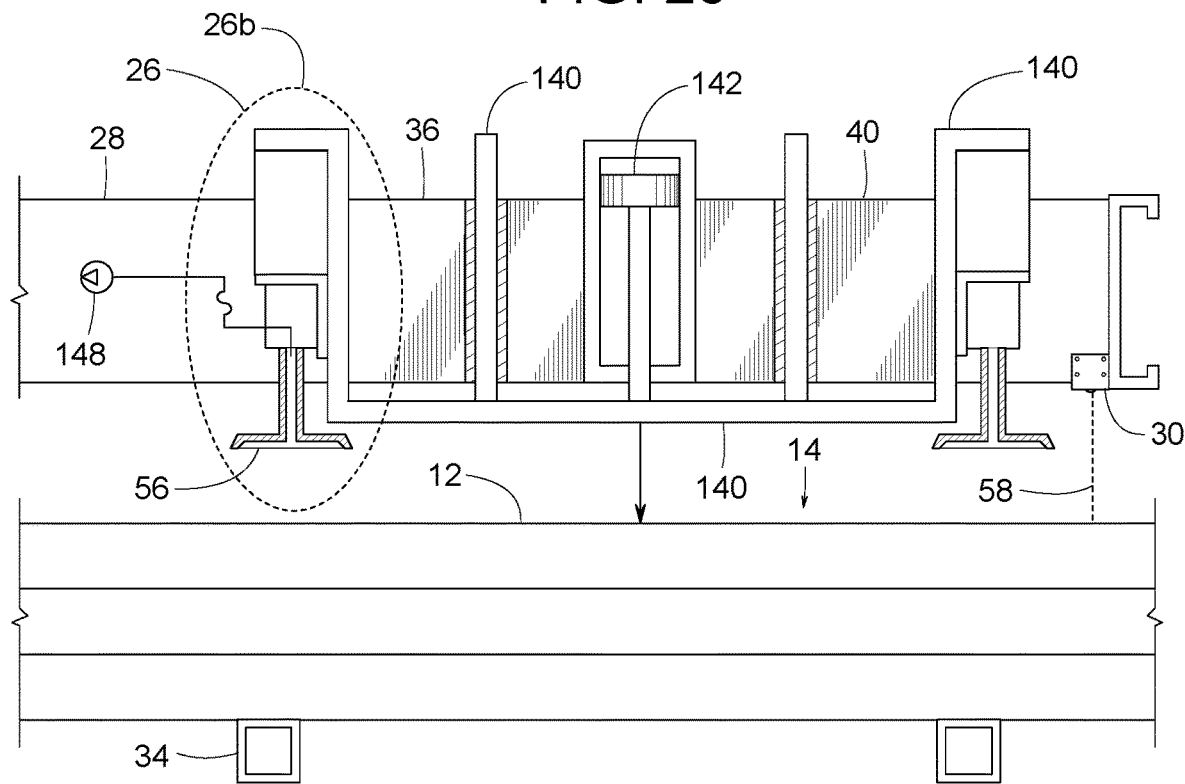
FIG. 26 is a cross-sectional side view of another example board picker constructed in accordance with the teachings disclosed herein, wherein a suction cup of the board picker is above and spaced apart from a board.
Figure 27:
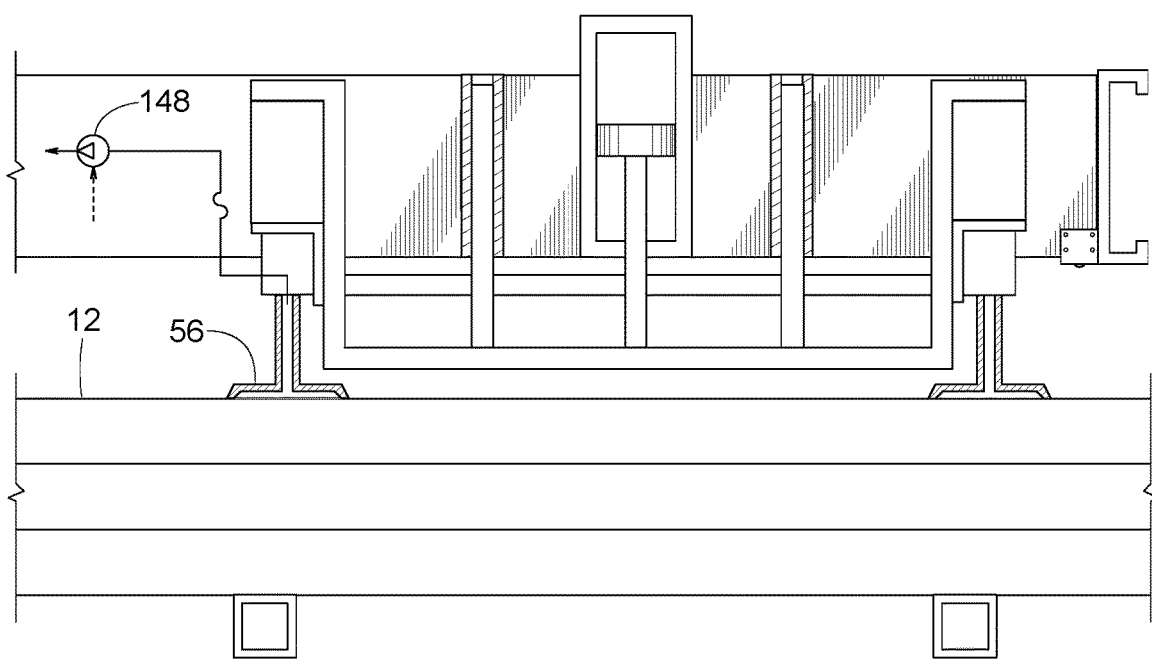
FIG. 27 is a cross-sectional side view similar to FIG. 26 but showing the suction cup applying suction to the board.
Figure 28:
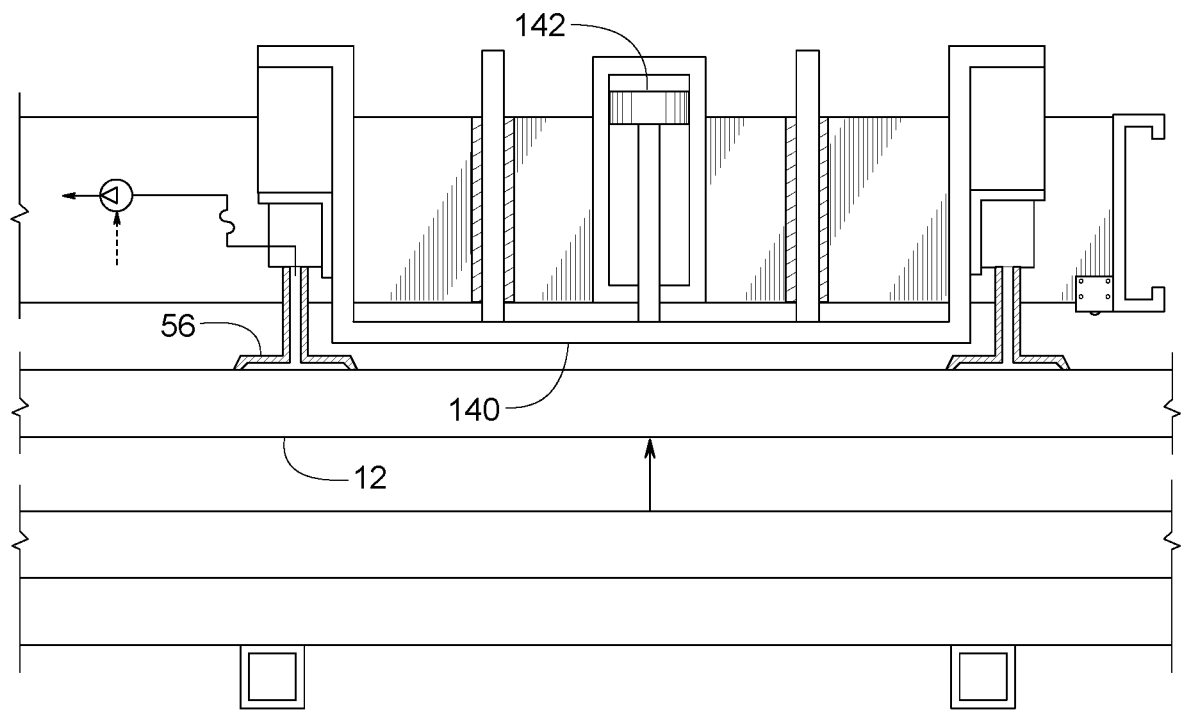
FIG. 28 is a cross-sectional side view similar to FIGS. 26 and 27 but showing the board picker lifting the board.
Figure 29:
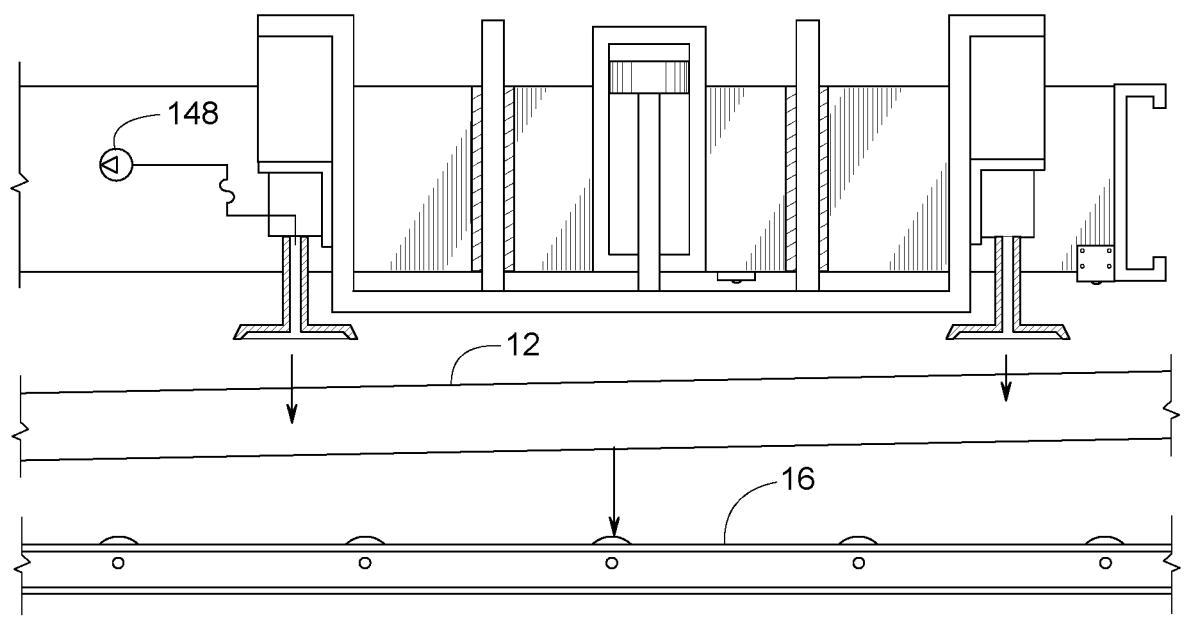
FIG. 29 is a cross-sectional side view similar to FIGS. 26, 27 and 28 but showing the board picker releasing the board.

FIG. 26 shows frame actuator 142 lowering frame 140 and suction cup 56 toward board 12 at station 14. FIG. 27 shows vacuum pump 148 applying suction to suction cup 56. FIG. 28 shows frame actuator 142 lifting frame 140, suction cup 56 and board 12. FIG. 29 shows vacuum pump 148 releasing its suction, thereby allowing board 12 to fall down against board-receiving apparatus 16.

In at least some of the illustrated examples, arrow 74 in FIG. 3 represents lifting first board 12a from first station 14a. FIGS. 3 and 4 show suspending first board 12a from trolley system 28. FIGS. 2, 3 and 4 show transferring first board 12a in forward direction 68 from first station 14a to board-receiving apparatus 16. Arrow 80 of FIG. 2 represents moving first board 12a in predetermined direction 84 while transferring first board 12a from board-receiving apparatus 16 to saw 18, wherein predetermined direction 84 is substantially perpendicular to forward direction 68. Arrow 86 of FIG. 5 represents creating first board segment 88 by cutting first board 12a with saw 18. Arrow 98 in FIG. 7 represents lifting second board 12b from second station 14b. FIGS. 7 and 8 show suspending second board 12b from trolley system 28. Arrows 94 and 96 in FIG. 6 and arrows 98 and 100 in FIG. 7 represent transferring second board 12b in forward direction 68 from second station 14b, over first station 14a, and to board-receiving apparatus 16. Arrow 80 of FIG. 6 represents moving second board 12b in predetermined direction 84 while transferring second board 12b from board-receiving apparatus 16 to saw 18. Arrow 108 of FIG. 9 represents creating second board segment 110 by cutting second board 12b with saw 18. Arrow 128 of FIG. 15 represents lifting third board 12c from third station 14c. FIGS. 15 and 16 show suspending third board 12c from trolley system 28. Arrow 132 of FIG. 16 and arrows 128 and 130 of FIG. 15 represents transferring third board 12c in reverse direction 122 from third station 14c to board-receiving apparatus 16, wherein reverse direction 122 is substantially opposite of forward direction 68. Arrow 80 of FIG. 14 represents moving third board 12c in predetermined direction 84 while transferring third board 12c from board-receiving apparatus 16 to saw 18. Arrow 134 of FIG. 17 represents creating third board segment 136 by cutting third board 12c with saw 18. Arrows 150 and 152 of FIGS. 5 and 9, and arrows 154 and 156 of FIGS. 13 and 17 represent assembling selectively first board assembly 22a (truss) and second board assembly 22b (wall panel), wherein first board assembly 22a includes at least part of first board 12a and at least part of second board 12b but excludes third board 12c, and second board assembly 22b includes at least part of first board 12a' and at least part of third board 12c but excludes second board 12b.

Although certain example methods, apparatus and articles of manufacture have been described herein, the scope of the coverage of this patent application is not limited thereto. On the contrary, this patent application covers all methods, apparatus and articles of manufacture fairly falling within the scope of the appended claims either literally or under the doctrine of equivalents.

The invention claimed is:

1. A lumber retrieval system comprising:
a saw;
a plurality of boards including at least a first board, a second board and a third board; wherein the first board, the second board and the third board are of different sizes;
a first station, a second station and a third station initially storing the plurality of boards, wherein the first board is initially at the first station, the second board is initially at the second station, and the third board is initially at the third station;
a board-receiving apparatus between the first station and the third station, the first station being between the board-receiving apparatus and the second station;
a trolley system extending over the first station, over the second station, over the third station and over the board-receiving apparatus;
a first board path defined by the trolley system, the first board path extending in a forward direction from the first station to the board-receiving apparatus;
a second board path defined by the trolley system, the second board path extending in a forward direction from the second station, over the first station and to the board-receiving apparatus;
a third board path defined by the trolley system, the third board path extending in a reverse direction from the third station to the board-receiving apparatus, wherein the reverse direction is opposite of the forward direction; and
a saw-feeding path defined by the board-receiving apparatus, the saw-feeding path extending from the board-receiving apparatus to the saw, wherein the saw-feeding path is substantially perpendicular to the first board path, the second board path and the third board path.

2. The lumber retrieval system of claim 1, wherein each of the first station, the second station and the third station has an inclined surface upon which at least some of the plurality of boards rests.

3. The lumber retrieval system of claim 1, wherein each of the first station, the second station and the third station has a cart upon which at least some of the plurality of boards rests.

4. The lumber retrieval system of claim 1, further comprising a board-engaging screw carried by the trolley system.

5. The lumber retrieval system of claim 1, further comprising a board-engaging suction cup carried by the trolley system.

6. The lumber retrieval system of claim 1, further comprising:
a first touch-free sensor carried by the trolley system, the first touch-free sensor being in scanning relationship with the plurality of boards;
a second touch-free sensor carried by the trolley system, the second touch-free sensor being in scanning relationship with the plurality of boards; and
a board picker carried by the trolley system, the board picker being between the first touch-free sensor and the second touch-free sensor with reference to a horizontal direction.

7. The lumber retrieval system of claim 6, wherein:
the first touch-free sensor being primarily dedicated to the plurality of boards at the first station and the second station; and
a second touch-free sensor being primarily dedicated to the plurality of boards at the third station.

8. The lumber retrieval system of claim 6, wherein the board picker, the first touch-free sensor and the second touch-free sensor move in unison with reference to the horizontal direction.

9. The lumber retrieval system of claim 1, wherein the trolley system includes a first carrier and a second carrier, the first carrier carrying the first board along the first board path, the first carrier carrying the second board along the second board path, and the second carrier carrying the third board along the third board path.

10. The lumber retrieval system of claim 1, wherein the trolley system includes a first carrier and a second carrier, and the lumber retrieval system has a first operating mode and a second operating mode such that:
in the first operating mode, the first carrier carrying the first board along the first board path, the first carrier carrying the second board along the second board path, and the second carrier carrying the third board along the third board path; and
in the second operating mode, the first carrier carrying the first board along the first board path while the second carrier is substantially stationary, the first carrier carrying the second board along the second board path while the second carrier is substantially stationary, and the first carrier carrying the third board along the third board path while the second carrier is substantially stationary.

* * * * *